United States Patent
Satoh et al.

(10) Patent No.: US 7,348,955 B2
(45) Date of Patent: Mar. 25, 2008

(54) METHOD OF CONTROLLING DISPLAY METHOD, DISPLAY-USE SIGNAL PRODUCING DEVICE, DISPLAY DEVICE, AND DISPLAY SYSTEM FOR IMPLEMENTING THE METHOD

(75) Inventors: Masakazu Satoh, Tenri (JP); Masahiro Adachi, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 427 days.

(21) Appl. No.: 10/170,523

(22) Filed: Jun. 13, 2002

(65) Prior Publication Data
US 2002/0196244 A1    Dec. 26, 2002

(30) Foreign Application Priority Data
Jun. 15, 2001  (JP)  ............................. 2001-180951
May 16, 2002   (JP)  ............................. 2001-141916

(51) Int. Cl.
*G09G 3/36* (2006.01)
(52) U.S. Cl. ........................... 345/98; 345/95; 345/102
(58) Field of Classification Search ................. 345/87, 345/473, 88–102, 74.1; 348/537, 465, 481, 348/716, 598–694; 380/212, 255; 386/27, 386/105; 375/240.01
See application file for complete search history.

(56) References Cited

U.S. PATENT DOCUMENTS

| | | | | |
|---|---|---|---|---|
| 4,321,623 A | * | 3/1982 | Rzeszewski | 348/481 |
| 4,646,135 A | * | 2/1987 | Eichelberger et al. | 375/240.01 |
| 4,694,489 A | * | 9/1987 | Frederiksen | 380/212 |
| 5,185,794 A | * | 2/1993 | Thompson et al. | 380/235 |
| 5,457,473 A | | 10/1995 | Arai et al. | |
| 5,459,482 A | * | 10/1995 | Orlen | 345/98 |
| 5,596,372 A | * | 1/1997 | Berman et al. | 348/537 |
| 5,631,713 A | * | 5/1997 | Hoshino | 348/716 |
| 5,767,830 A | * | 6/1998 | Kawamura | 345/99 |
| 5,909,201 A | * | 6/1999 | Hush et al. | 345/74.1 |
| 6,057,822 A | * | 5/2000 | Tsubota | 345/98 |

(Continued)

FOREIGN PATENT DOCUMENTS

JP    09-200710    7/1997

(Continued)

*Primary Examiner*—David L. Lewis
(74) *Attorney, Agent, or Firm*—David G. Conlin; Steven M. Jensen; Edwards Angell Palmer & Dodge LLP

(57) ABSTRACT

The sending party of a display-use image signal adds to a signal representing a display image a control parameter signal composed of a control tag signal specifying a controlled object and control start/end identification signal Ts or Te between a specific parameter start signal Ps and parameter end signal Pe. Upon the reception of the thus produced display-use image signal Si, a display device detects the signal Ps in the input signal Si using a tag decoder and makes a judgement whether the succeeding start/end identification signal is Ts or Te. Thereafter, upon the detection of Pe in the input signal Si, a control tag signal is derived from a signal division between the detected Ps and Pe, and signals C1 to C4 for controlling various parts of the display device, etc. are produced from the control tag signal and the judgement of the start/end identification signal. Hence, using the display-use image signal containing control information, extensive, complex controls are readily carried out of a display method applied to a display device.

8 Claims, 17 Drawing Sheets

U.S. PATENT DOCUMENTS

| | | | |
|---|---|---|---|
| 6,239,843 B1 * | 5/2001 | Gaudreau | 348/465 |
| 6,256,449 B1 * | 7/2001 | Eto | 386/27 |
| 6,335,720 B1 * | 1/2002 | Mori et al. | 345/98 |
| 6,476,815 B1 | 11/2002 | Ando | |
| 6,574,422 B1 * | 6/2003 | Kikuchi et al. | 386/105 |
| 6,683,585 B1 | 1/2004 | Nakano | |
| 2001/0010663 A1 * | 8/2001 | Nakazawa et al. | 345/473 |
| 2001/0013850 A1 * | 8/2001 | Sakaguchi et al. | 345/87 |

FOREIGN PATENT DOCUMENTS

| | | |
|---|---|---|
| JP | 10-133846 | 5/1998 |
| JP | 10-232658 | 9/1998 |
| JP | 11-122507 | 4/1999 |
| JP | 2002-149142 | 5/2002 |
| WO | WO-01/06485 | 1/2001 |

* cited by examiner

FIG. 3

| TAG | CODE |
|---|---|
| Ps (<) | 011000 |
| Pe (>) | 000110 |
| Ts | 010000 |
| Te (/) | 000010 |
| drv_m | 101010 |
| drv_s | 010101 |
| blight | 010010 |
| frm_rate | 101101 |
| disp | 011011 |
| ⋮ | ⋮ |

FIG. 4

| CHARACTER STRING | CODE |
|---|---|
| drv_m | 101010 |
| drv_s | 010101 |
| blight | 010010 |
| frm_rate | 101101 |
| disp | 011011 |

FIG. 5 (a)

```
<drv_m>
<disp>
<img src="img.gif">
</disp>
</drv_m>
```

FIG. 5 (b)

```
<drv_s>
<disp>
<img src="txt.bmp">
</disp>
</drv_s>
```

```
<drv_m>
<disp>
<img src="img.gif">
    <drv_s>
    <disp>
    TEXT
    </disp>
    </drv_s>
</disp>
</drv_m>
```

```
<drv_m>
<blight>
<disp>
<img src="img.gif">
/* BACKLIGHT UNDER CONTROL */
</disp>
</blight>
</drv_m>
```

```
<drv_m>
<frm_rate>
<disp>
<img src="img.gif">
/* FRAME RATE CHANGED */
</disp>
</frm_rate>
</drv_m>
```

```
<drv_m>
<disp>
<img src="img.gif">
</disp>
</drv_m>
```

```
<drv_s>
<disp>
<img src="txt.bmp">
</disp>
</drv_s>
```

```
<blight>
<disp>
<img src="img.gif">
/*BACKLIGHT UNDER CONTROL*/
</disp>
</blight>
```

```
<frm_rate>
<disp>
<img src="img.gif">
/* FRAME RATE CHANGED */
</disp>
</frm_rate>
```

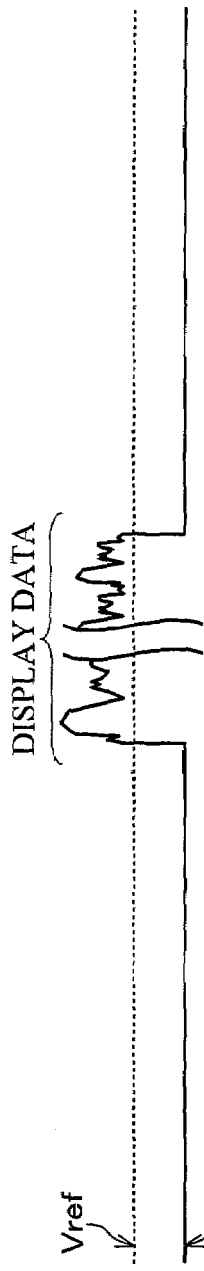
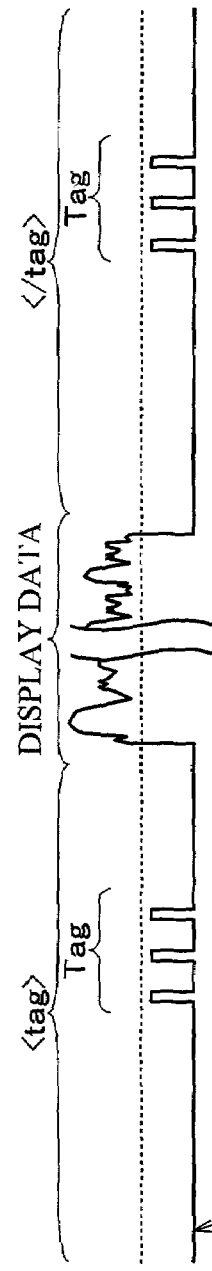
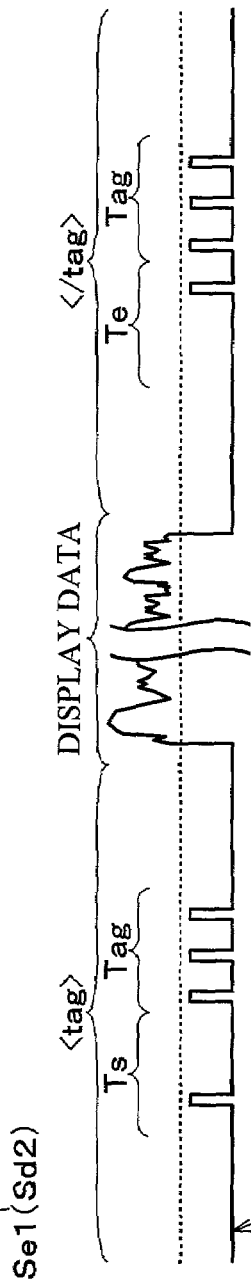
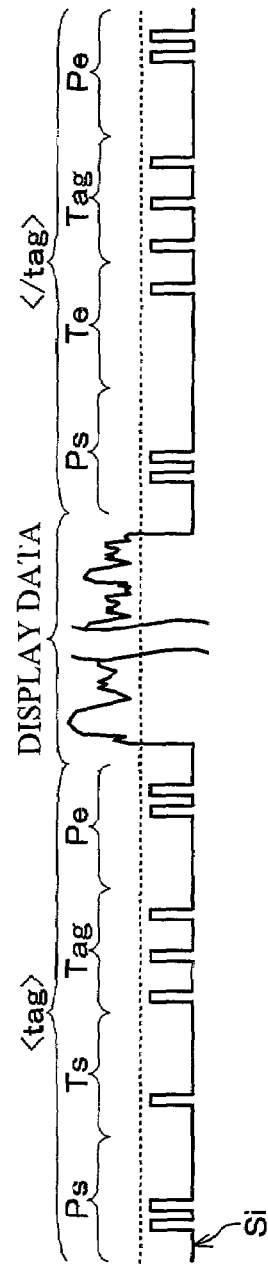
FIG. 22 (a)
FIG. 22 (b)
FIG. 22 (c)
FIG. 22 (d)

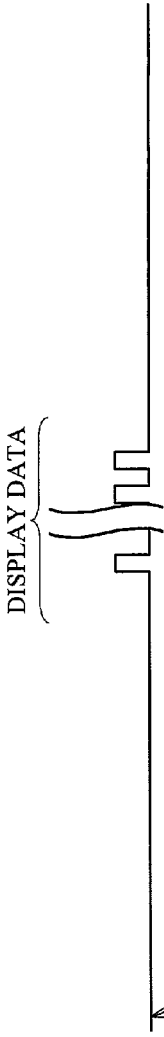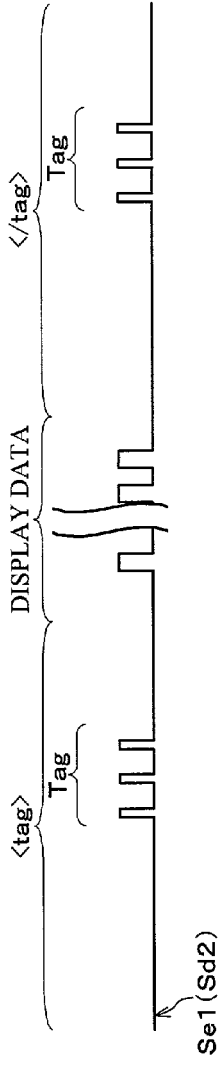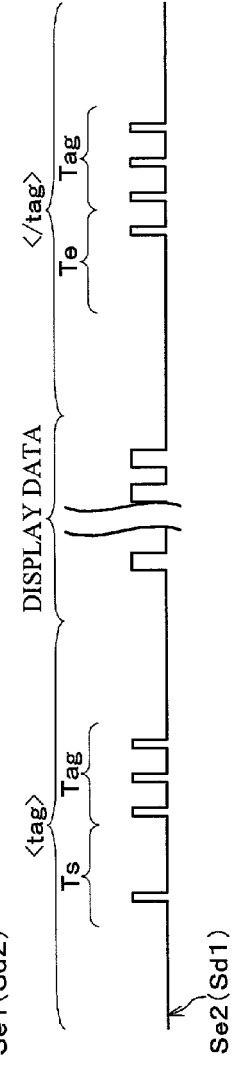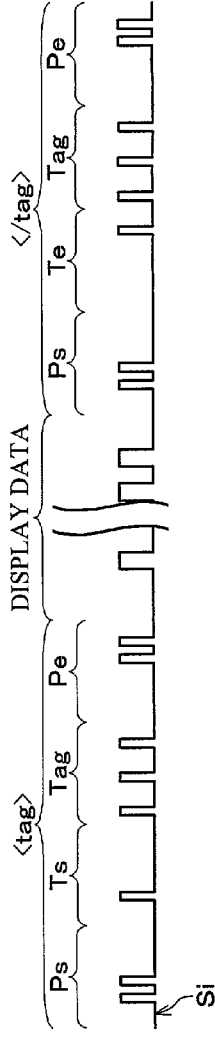
FIG. 24 (a) FIG. 24 (b) FIG. 24 (c) FIG. 24 (d)

METHOD OF CONTROLLING DISPLAY METHOD, DISPLAY-USE SIGNAL PRODUCING DEVICE, DISPLAY DEVICE, AND DISPLAY SYSTEM FOR IMPLEMENTING THE METHOD

FIELD OF THE INVENTION

The present invention relates to a display control method of controlling liquid crystal, EL (Electronic Luminescence), and other display devices by means of a control parameter carried on a display-use image signal, and also relates to display devices operating by such a display control method.

BACKGROUND OF THE INVENTION

Display devices which control a display method by means of a parameter carried on a signal representative of a displayed image are conventionally known. For example, Japanese Laid-open Patent Application 11-122507 (Tokukaihei 11-122507, published on Apr. 30, 1999) discloses a video image signal processing device which is featured by the provision of an image processing means for implementing a stabilization control, scanning conversion, and other tasks based on a reference signal, a judgement signal, etc. inserted in the blanking interval of the video image signal. Another example is Japanese Laid-open Patent Application (Tokukaihei 10-133846, published on May 22, 1998) disclosing an image display device which controls brightness, display size, display position, and screen distortion correction based on a parameter, inserted in a display period of display data, which is acquired by sampling a signal produced by pulse counts based on horizontal and vertical synchronous signals.

However, to control a display method which is extensive and complex, a complex control parameter is required. The problem cannot be solved by inserting a parameter in a blanking interval as with the video image signal processing device disclosed in Tokukaihei 11-122507. As to the image display disclosed in Tokukaihei 10-133846, a parameter can be inserted in display data (in a display period); nevertheless, this constitution cannot deal with some really extensive and complex display methods which requires the insertion of complex parameter data. According to the constitution, since the parameter is acquired based on a horizontal synchronous signal and a vertical synchronous signal, inserting parameters in different positions in the display data adds to the complexity of the mechanism by which the parameters are derived from the display data.

The prior art technology is not readily applicable to the control of a display method of marked extensiveness and complexity of, for example, selecting among driver circuits (drivers) in a display device, turning on/off the backlight in a liquid crystal display, and switching between frame frequencies, and particularly so when more than one of the factors (operating driver, turn-on and -off of the backlight, frame frequency, etc.) which dictate the display method are to be controlled simultaneously to enable various display methods as required. Therefore, the prior art technology cannot readily produce display data with parameters inserted therein to control notably extensive and complex display methods. The mechanism (decoder) required to acquire the parameters from the display data is also complex.

SUMMARY OF THE INVENTION

The present invention has an objective to offer a control method to readily implement an extensive and complex control of a display method for use with a display device and a display device operating by such a control method.

A display control method of the present invention is a control-information-based control method applied to an image display method using a display device, and includes the step of feeding, to the display device, a display-use image signal carrying, in addition to display information representing an image to be displayed, control information by which a display method is controlled, and is characterized in that the display-use image signal contains a display data signal corresponding to the display information, a control parameter signal corresponding to the control information, a parameter start signal which is a first predetermined signal provided immediately before the control parameter signal, and a parameter end signal which is a second predetermined signal provided immediately after the control parameter signal.

Another display control method of the present invention is a control-information-based control method applied to an image display method using a display device, and includes the step of feeding, to the display device, a display-use image signal carrying, in addition to display information representing an image to be displayed, control information by which a display method is controlled, and is characterized in that:

the display-use image signal contains an analog display data signal corresponding to the display information and a control information signal corresponding to the control information; and the control information signal is made distinguishable from the display data signal by either specifying a maximum electric potential level of the control information signal to a value lower than a minimum electric potential level of the display data signal or specifying a minimum electric potential level of the control information signal to a value higher than a maximum electric potential level of the display data signal.

Another display control method of the present invention is a control-information-based control method applied to an image display method using a display device, and includes the step of feeding, to the display device, a display-use image signal carrying, in addition to display information representing an image to be displayed, control information by which a display method is controlled, and is characterized in that:

the display-use image signal contains a digital display data signal corresponding to the display information and a control information signal corresponding to the control information; and the control information signal is made distinguishable from the display data signal by specifying a frequency of the control information signal to a value greater than a frequency of the display data signal.

According to such a display control method, a display-use image signal carrying control information by which a display method is controlled is fed to a display device which displays the image represented by a display data signal by a display method based on a control parameter signal provided between a parameter start signal and a parameter end signal in the display-use image signal.

Alternatively, a display-use image signal carrying control information by which a display method is controlled and a display data signal is fed to a display device where the control information signal is distinguishable in the display-use image signal by means of differences in electric potential level or frequency between the control information signal and the display data signal. Therefore, in the display device, the image represented by the display data signal is displayed by the display method based on the control information signal.

A display-use signal producing device of the present invention is a display-use signal producing device for producing a display-use image signal carrying, in addition to display information representing an image to be displayed, control information by which an image display method is controlled, and is characterized in that:

signal producing means for receiving signal defining data by which a structure of the display-use image signal to be produced is defined and producing a parameter-added display data signal containing a control parameter signal corresponding to the control information and a display data signal corresponding to the display information in accordance with the signal defining data; and parameter start/end signal appending means for appending a parameter start signal, which is a first predetermined signal, distinguishable from other signals, immediately before the control parameter signal in the parameter-added display data signal and appending a parameter end signal, which is a second predetermined signal, distinguishable from other signals, immediately after the control parameter signal in the parameter-added display data signal.

Alternatively, a display-use signal producing device of the present invention is a display-use signal producing device for producing a display-use image signal carrying, in addition to display information representing an image to be displayed, control information by which an image display method is controlled, and is characterized in that the display-use signal producing device includes:

signal producing means for receiving signal defining data by which a structure of the display-use image signal to be produced is defined and producing the display-use image signal containing a control information signal corresponding to the control information and an analog display data signal corresponding to the display information in accordance with the signal defining data;

signal level judging means for judging an electric potential level of the display data signal; and electric potential level specifying means for either causing a maximum electric potential level of the control information signal contained in the display-use image signal produced by the signal producing means to be lower than a minimum electric potential level of the display data signal or causing a minimum electric potential level of the control information signal to be higher than a maximum electric potential level of the display data signal based on the electric potential level of the display data signal judged by the signal level judging means.

Alternatively, a display-use signal producing device of the present invention is a display-use signal producing device for producing a display-use image signal carrying, in addition to display information representing an image to be displayed, control information by which an image display method is controlled, and is characterized in that the display-use signal producing device includes:

signal producing means for receiving signal defining data by which a structure of the display-use image signal to be produced is defined and producing the display-use image signal containing a control information signal corresponding to the control information and a digital display data signal corresponding to the display information in accordance with the signal defining data;

signal frequency judging means for judging a frequency of the display data signal; and clock signal producing means for causing a frequency of the control information signal contained in the display-use image signal produced by the signal producing means to be higher than a frequency of the display data signal based on the signal frequency of the display data signal judged by the signal frequency judging means.

According to such a display-use signal producing device, a control parameter signal by which a display method is controlled is added to a display-use image signal between two specific signals, namely a parameter start signal and a parameter end signal, which are distinguishable from other signal parts.

Alternatively, a control information signal by which a display method is controlled is added to a display-use image signal so as to be distinguishable from an analog or digital display data signal.

A display device of the present invention is a display device for receiving a display-use image signal carrying, in addition to display information representing an image to be displayed, control information by which an image display method is controlled and displaying the image represented by the display information by the display method based on the control information, and is characterized in that the display device includes:

detecting means for receiving, as the display-use image signal, a signal containing a display data signal corresponding to the display information, a control parameter signal corresponding to the control information, a parameter start signal which is a first specifying signal provided immediately before the control parameter signal, and a parameter end signal which is a second specifying signal provided immediately after the control parameter signal and detecting the parameter start signal and the parameter end signal in the received display-use image signal; and display control means, for deriving, as a control parameter signal, a signal part sandwiched between the parameter start signal and the parameter end signal detected in the display-use image signal and controlling the method of displaying the image represented by the display data signal based on the derived control parameter signal.

Alternatively, a display device of the present invention a display device for receiving a display-use image signal carrying, in addition to display information representing an image to be displayed, control information by which an image display method is controlled and displaying the image represented by the display information by the display method based on the control information, and is characterized in that the display device includes:

a control/display signal judging unit for extracting a control information signal corresponding to the control information from the display-use image signal including the control information signal and an analog display data signal corresponding to the display information, the control information signal being such that either a maximum electric potential level thereof is specified to be lower than a minimum electric potential level of the display data signal or a minimum electric potential level thereof is specified to be higher than a maximum electric potential level of the display data signal, by receiving the display-use image signal and checking whether the received display-use image signal has an electric potential level higher or lower than a reference electric potential level; and display control means for controlling the method of displaying the image represented by the display data signal based on the control information signal extracted from the display-use image signal.

Another display device of the present invention is a display device for receiving a display-use image signal carrying, in addition to display information representing an image to be displayed, control information by which an image display method is controlled and displaying the image represented by the display information by the display method based on the control information, and is characterized in that the display device includes:

a control/display signal judging unit for extracting a control information signal corresponding to the control information from the display-use image signal including the control information signal and a digital display data signal corresponding to the display information, by receiving the display-use image signal of which the control information signal is specified to have a frequency higher than that of the display data signal and checking whether the received display-use image signal has a frequency higher or lower than a reference frequency; and display control means for controlling the method of displaying the image represented by the display data signal based on the control information signal extracted from the display-use image signal.

According to such a display device, as the display-use image signal is fed to the display device, the image represented by the display data signal is displayed by a display method based on a control parameter signal provided between a parameter start signal and a parameter end signal in the display-use image signal.

Alternatively, as the display-use image signal is fed to the display device, the image represented by the display data signal is displayed by a display method based on a control information signal provided in the display-use image signal so that the control information signal can be distinguished from an analog or digital display data signal.

For a fuller understanding of the nature and advantages of the invention, reference should be made to the ensuing detailed description taken in conjunction with the accompanying drawings.

BRIEF DESCRIPTION OF THE DRAWINGS

FIG. 3 shows tags and equivalent codes used in producing a display-use image signal in the embodiment.

FIG. 4 shows a tag table for a display-use signal producing device in accordance with the embodiment.

FIG. 5(a) and FIG. 5(b) show a first example and a second example, respectively, of signal defining data used in the embodiment.

FIG. 6(a) shows a third example of signal defining data used in the embodiment, and FIG. 6(b) shows a display corresponding to that data.

FIG. 15(a) and FIG. 15(b) show a first example and a second example of signal defining data used in a first modified example of the embodiment.

FIG. 22(a) to FIG. 22(d) depict the basic concepts of a process of producing a display-use image signal using the display-use signal producing device in FIG. 21.

FIG. 24(a) to FIG. 24(d) depict the basic concepts of a process of producing a display-use image signal using the display-use signal producing device in FIG. 23.

DESCRIPTION OF THE EMBODIMENTS

Figure 1:
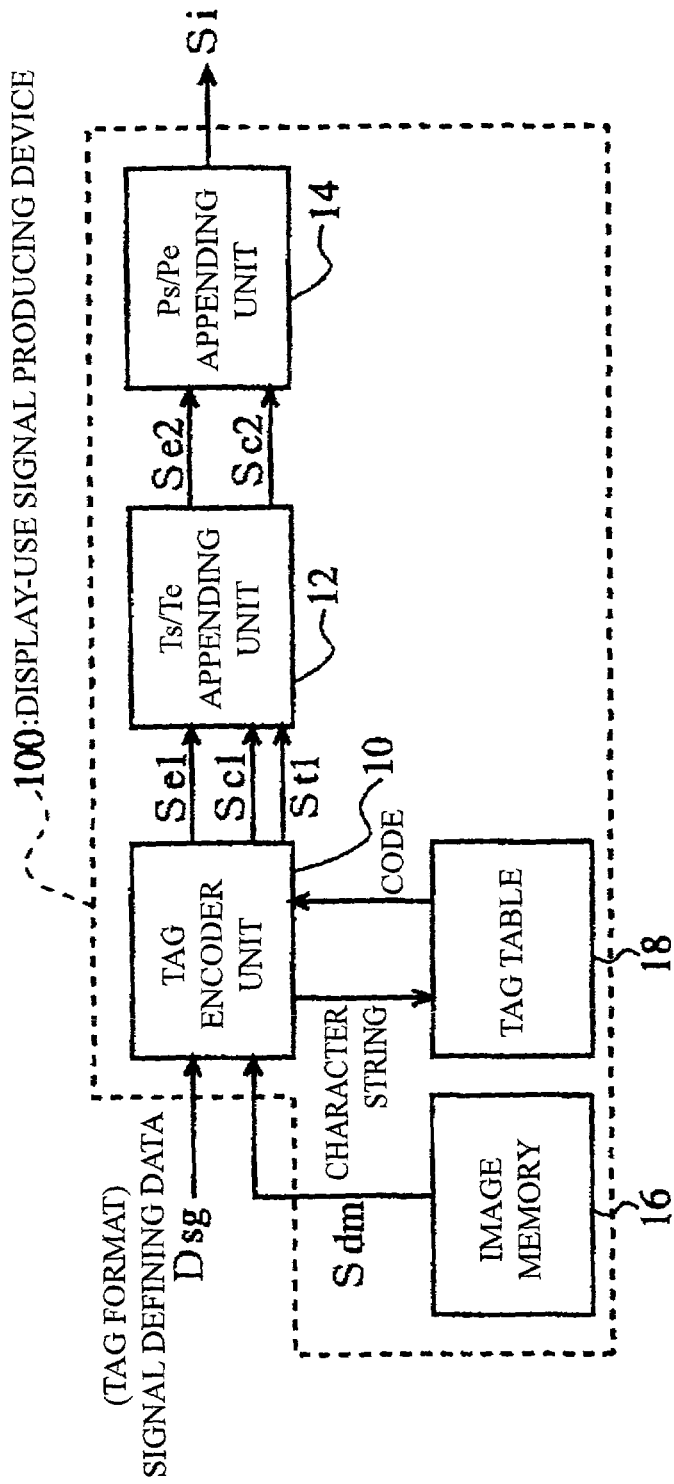
FIG. 1 is a block diagram showing the constitution of a display-use signal producing device for implementing a display control method of an embodiment in accordance with the present invention.

The following will describe a display control method of an embodiment in accordance with the present invention, that is, a method of controlling a display method of a display device. A display control method of the present embodiment is performed by a display system including: a display-use signal producing device which produces a display-use image signal which carries control information by means of which the display method is controlled, as well as display information representing the image to be displayed; and a display device which receives the display-use image signal from the display-use signal producing device and which displays the image by the display method using the control information carried thereon. The display device corresponds to, for example, a liquid crystal display for a PC or personal computer. When this is the case, the display-use signal producing device is typically mounted in the PC with the display-use image signal produced there being sent from the PC to the liquid crystal display. Alternatively, the liquid crystal display may contain the display-use signal producing device. In actual practice, a delay element is contained in the device so as to adjust timings of signals, but will be omitted in the following description for the sake of convenience.

<1. Display-use Signal Producing Device>

A display-use signal producing device for implementing a control method in accordance with the present embodiment (hereinafter, will be referred to as a "display-use signal producing device based on the present embodiment") produce a signal as a display-use image signal by adding control information by which the display method of the image is controlled, that is, control information on the display functions of the display device, to an image signal representative of an image to be displayed by a display device. The structure of the produced display-use image signal is predefined using tags of XML (eXtensible Markup Language) or another markup language. An example of such signal defining data Dsg is shown in FIG. 5(a). In the definition using the signal defining data Dsg, each control parameter as control information on the display functions is placed between "<" and ">" and specifies a controlled object and the start or end of the control. Accordingly, the controlled object is specified by a character string which acts as a control tag (hereinafter, the character string itself will be referred to as a control tag). A control parameter which contains only a control tag and is placed between "<" and ">" indicates the start of the control. A control parameter which contains a control tag preceded by "/" and is placed between "<" and ">" indicates the end of the control. Here, the display device is a liquid crystal display device equipped with a liquid crystal panel driven by a main driver, a sub-driver, and a scan driver, includes a backlight for the liquid crystal panel, and has a function to control the display frame frequency of the liquid crystal panel. In this case, as control tags specifying controlled objects are there prepared: a main driver control tag "drv_m" indicating control of the main driver; a sub-driver control tag "drv_s" indicating control of the sub-driver; a backlight control tag "blight" indicating control of the backlight; and a frame rate control tag "frm_rate" indicating control of the frame frequency. Besides, a display tag "disp" is also prepared in the following to specify the start or end of display data. Any tag used in the present embodiment is encoded as shown in FIG. 3 when added to the display-use image signal. Although FIG. 3 shows control tags of a fixed length, i.e. 6 bits, they do not necessarily have a fixed length.

FIG. 1 is a block diagram schematically showing the constitution of a display-use signal producing device 100 based on the present embodiment. The display-use signal producing device 100 includes a tag encoder unit 10, a Ts/Te appending unit 12, a Ps/Pe appending unit 14, an image memory 16, and a tag table 18. The tag encoder unit 10 receives signal defining data Dsg written in the tag format. The image memory 16 prerecords image data representative of an image to be displayed by the display device. The tag table 18 associates codes with character strings representing respective control tags which can be written as signal defining data Dsg as shown in FIG. 4. The tag table 18 is provided in the form of ROM (Read Only Memory) or associative memory so that the control tag is translated from a character string data set to a corresponding code.

In the display-use signal producing device 100, the tag encoder unit 10 encodes the control tag provided as a character string contained in incoming signal defining data Dsg according to the definition given by the signal defining data Dsg using the tag table 18, and in addition, produces a first encoder signal Se1 by retrieving image data from the image memory 16 according to the definition given by the signal defining data Dsg and inserting the encoded control tag to that image data. The tag encoder unit 10 produces a first tag code division signal Sc1 and a start/end identification signal St1 for output. The first tag code division signal Sc1 is HIGH (high level) during divisions of the first encoder signal Se1 in which the control tag is present and remains LOW (low level) in the other divisions. The start/end identification signal St1 indicates the start and end of control by means of the inserted control tag. When a control tag in a control parameter indicating the start of control is inserted, the start/end identification signal St1 goes HIGH at a point in time which corresponds to an insertion point of the control tag in the first encoder signal Se1 and remains so until a control tag contained in the control parameter indicating the end of the control is inserted thereafter. In contrast, when a control tag contained in a control parameter indicating the end of control is inserted, the start/end identification signal St1 goes LOW at a point in time which corresponds to an insertion point of the control tag in the first encoder signal Se1 and remains LOW until a control tag contained in a control parameter indicating the start of control is inserted thereafter. For example, if a signal defining data Dsg shown in FIG. 2(a) is received, the first encoder signal Se1, the first tag code division signal Sc1, and the start/end identification signal St1 shown in FIG. 2(b).

The first encoder signal Se1, the first tag code division signal Scd, and the start/end identification signal St1, which are outputs from the tag encoder unit 10, are fed to the Ts/Te appending unit 12. The Ts/Te appending unit 12 appends a start tag signal Ts or an end tag signal Te shown in FIG. 3 immediately before the control tag inserted to the first encoder signal Se1 based on the first tag code division signal Sc1. Here, if the start/end identification signal St1 is HIGH, since the control parameter containing the inserted control tag is indicating a start of control, the Ts/Te appending unit 12 appends the start tag signal Ts ("010000") immediately before the control tag. If the start/end identification signal St1 is LOW, since the control parameter containing the inserted control tag is indicating an end of control, the Ts/Te appending unit 12 appends the end tag signal Te ("000010") immediately before the control tag. The Ts/Te appending unit 12 outputs as a second encoder signal Se2 a first encoder signal Se1 together with the thus appended start tag signal Ts and end tag signal Te. Thus, a parameter-added display data signal which is composed of both a signal representative of an image to be displayed and a signal representative of a control parameter by which the display method of the image is controlled is produced as the second encoder signal Se2 by the tag encoder unit 10 and the Ts/Te appending unit 12. Further, the Ts/Te appending unit 12 outputs a second tag code division signal Sc2 which is HIGH during divisions of the second encoder signal Se2 in which a control tag, the start tag signal Ts, or the end tag signal Te is present and which remains LOW during the other divisions.

The second encoder signal Se2 and the second tag code division signal Sc2, which are outputs from the Ts/Te appending unit 12, are fed to the Ps/Pe appending unit 14 where a parameter start signal Ps ("011000") which is an equivalent to "<" (see FIG. 3) is appended immediately before the start tag signal Ts and the end tag signal Te which are appended to the second encoder signal Se2, and a parameter end signal Pe ("000110") which is an equivalent to ">" (see again FIG. 3) is appended immediately after the control tag inserted to the second encoder signal Se2, based on the second tag code division signal Sc2. Thus, the Ps/Pe appending unit 14 outputs as a display-use image signal Si the second encoder signal Se2 together with the appended parameter start signal Ps and parameter end signal Pe. The display-use image signal Si, whose structure is defined in the signal defining data Dsg as shown in FIG. 2(d), carries not only the display information representative of an image to be displayed by the display device, but also control information (representative of a control parameter) by which the display method of the image implemented by the display device is controlled.

Figure 2:
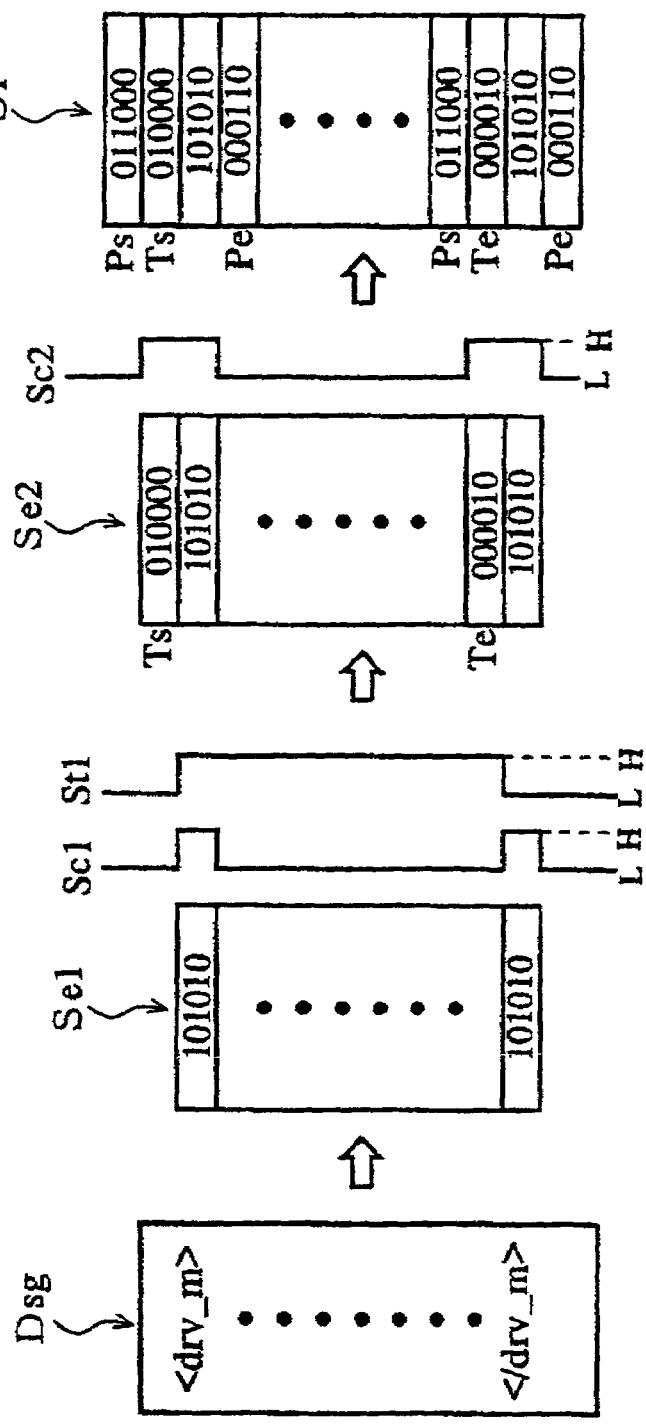
FIG. 2(a) to FIG. 2(d) depict the basic concepts of a process of producing a display-use image signal of the embodiment.
Figure 11:
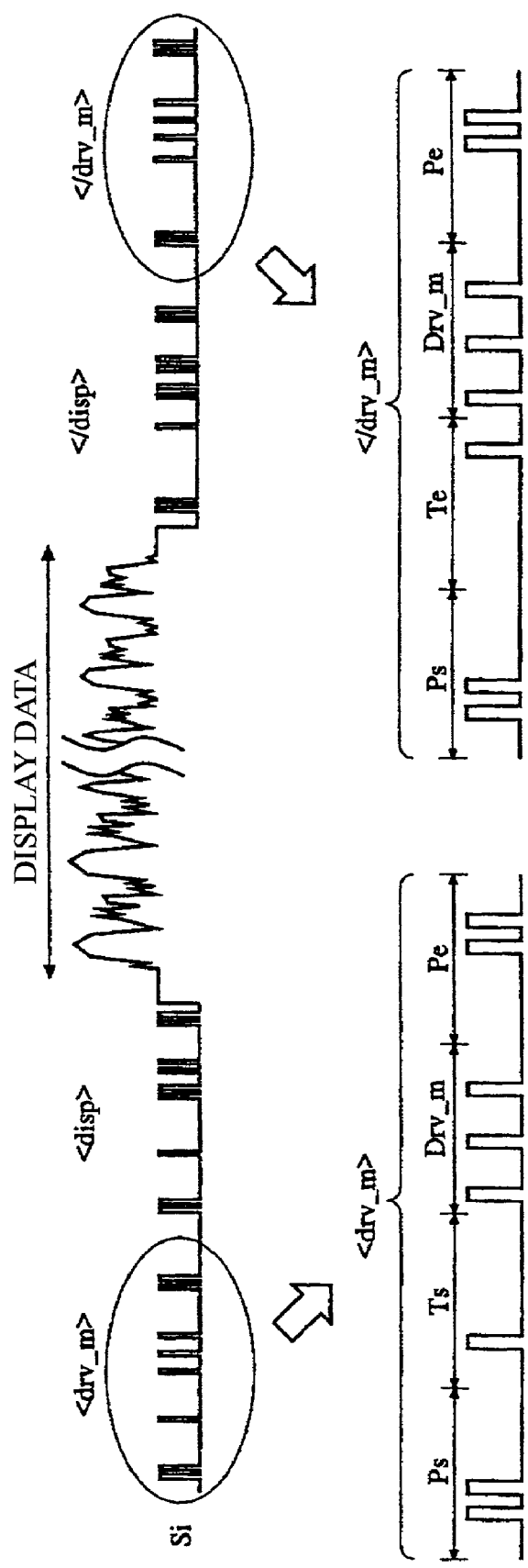
FIG. 11 shows signal waveform charts illustrating a first operation example of a display device in accordance with the embodiment.

FIG. 2(d) is a mere representation of the display-use image signal Si. The actual display-use image signal Si in the present embodiment has a waveform suitable for serial transmission as will be described later in reference to FIG. 11. The display-use image signal Si of the present embodiment is digital in those parts which carry a tag (the parameter start signal, parameter end signal, start tag signal, end tag signal, and control tag signal) and either analog or digital in those parts which carry display data. As to the display-use image signal Si, as shown in FIG. 11, if the display data is analog, the analog signal level is specified higher than the digital signal level, for example. Therefore, the parameter start signal Ps and the parameter end signal Pe are identifiable not only from the other tag-representing digital signals, but also from display-data-representing signals. The parameter start signal Ps and parameter end signal Pe are identifiable in the display-use image signal Si even when the display-use image signal Si is digital in those parts which carry display data unless, for example, the bit pattern corresponding to the parameter start signal Ps and the parameter end signal Pe is used to represent the values of the display data.

Thus, the display control signal Si of the present embodiment has a structure in which a signal (hereinafter, will be referred to as a control parameter signal) composed of a control tag signal and either the start tag signal Ts or the end tag signal Te is sandwiched by the parameter start signal Ps and the parameter end signal Pe which are safely identifiable in the display-use image signal Si. Note that in the following description, a control information signal is a signal composed of a control parameter signal and a parameter start signal Ps and a parameter end signal Pe which respectively precedes and succeeds the control parameter signal.

Now, an explanation will be given of specific constitutions of the display-use signal producing device as to the cases when the device is driven by an analog and digital signals.

(Analog Drive: Display Data Signal is Analog)

Figure 21:
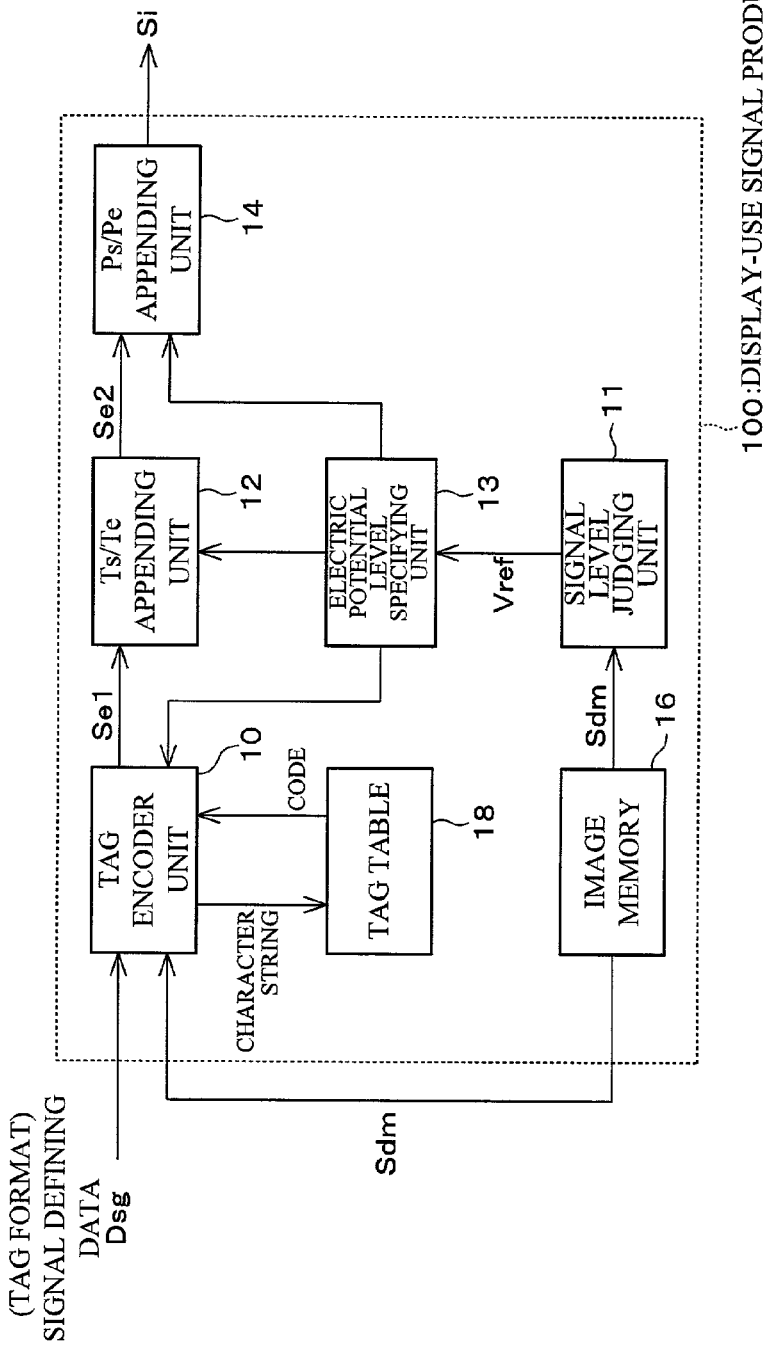
FIG. 21 is a block diagram showing the constitution of a display-use signal producing device which operates with an analog display data signal.

FIG. 21 is a block diagram showing the constitution of a display-use signal producing device 100 based on the present embodiment to produce a display-use image signal Si for use in analog drive. The display-use signal producing device 100 includes a tag encoder unit 10, a Ts/Te appending unit 12, a Ps/Pe appending unit 14, an image memory 16, a tag table 18, a signal level judging unit 11, and an electric potential level specifying unit 13. The tag encoder unit 10 is fed with the signal defining data Dsg written in the tag format. The image memory 16 holds prerecorded analog image data from which an image is produced by the display device. The tag table 18, as shown in FIG. 3, associates respectively codes to character strings representing control tags which can be written as signal defining data Dsg and is constituted by ROM (Read Only Memory) or associative memory, for example, so that an input of character string data of a control tag results in an output of a code of a corresponding control tag.

In the display-use signal producing device 100, the signal level judging unit 11 detects a minimum electric potential level of the image data prerecorded in the image memory 16 and determines a reference electric potential level Vref.

The electric potential level specifying unit 13 provides a means to specify electric potential levels of the component signals of the control information signal when producing them. The component signals are the control tag signal encoded by the tag encoder unit 10, the start tag signal Ts or the end tag signal Te appended by the Ts/Te appending unit 12, and the parameter start signal Ps or parameter end signal Pe appended by the Ps/Pe appending unit 14. Under these conditions, the electric potential level specifying unit 13 specifies the electric potential level of the control information signal based on the reference electric potential level Vref determined by the signal level judging unit 11, so that the encoded control tag signal has a maximum electric potential level which is lower than the minimum electric potential level of the image data prerecorded in the image memory 16. Note that the electric potential level specifying unit 13 may at least specify the electric potential levels of the parameter start signal Ps and the parameter end signal Pe as in the foregoing.

In the present embodiment, the method of determining the reference electric potential level Vref and that of producing the control information signal are not limited to the above methods. For example, in the signal level judging unit 11, the reference electric potential level Vref may be determined from the maximum electric potential level of the image data prerecorded in the image memory 16, and in the electric potential level specifying unit 13, the electric potential level may be specified so that the control information signal has a minimum electric potential level which is higher than the maximum electric potential level of the image data prerecorded in the image memory 16.

The tag encoder unit 10 encodes the control tag included as a character string in the incoming signal defining data Dsg according to the definition given by the signal defining data Dsg using the tag table 18. In addition to the encoding of control tags, the tag encoder unit 10 reads out image data Sdm (see FIG. 22(a)) from the image memory 16 according to the definition given by the signal defining data Dsg, inserts a pair of control tag signals Tag encoded by the image data Sdm to produce the first encoder signal Se1 (see FIG. 22(b)) for an output.

The first encoder signal Se1, which is an output from the tag encoder unit 10, is fed to the Ts/Te appending unit 12. The Ts/Te appending unit 12 appends the start tag signal Ts immediately before the first control tag signal Tag of the first encoder signal Se1 and the end tag signal Te immediately before the last control tag signal Tag of the first encoder signal Se1 to produce the second encoder signal Se2 (see FIG. 22(c)) for an output.

The second encoder signal Se2, which is an output from the Ts/Te appending unit 12, is fed to the Ps/Pe appending unit 14. The Ps/Pe appending unit 14 appends the parameter start signal Ps ("011000") shown in FIG. 3 as a signal which is an equivalent to "<" immediately before the start tag signal Ts and end tag signal Te appended in the second encoder signal Se2 and the parameter end signal Pe ("000110") shown in FIG. 3 as a signal which is an equivalent to ">" immediately after the control tag signal Tag inserted to the second encoder signal Se2. The Ps/Pe appending unit 14 thus produces a display-use image signal Si (see FIG. 22(d)) for an output, by appending the parameter start signal Ps and the parameter end signal Pe to the second encoder signal Se2.

The display-use image signal Si, whose structure is defined by means of the signal defining data Dsg, carries, as well as the display information representing the image to be displayed by the display device, control information (corresponding to control parameters) by which the method of displaying the image by the display device is controlled.

(Digital Drive: When Display Data Signal is Digital.)

Figure 23:
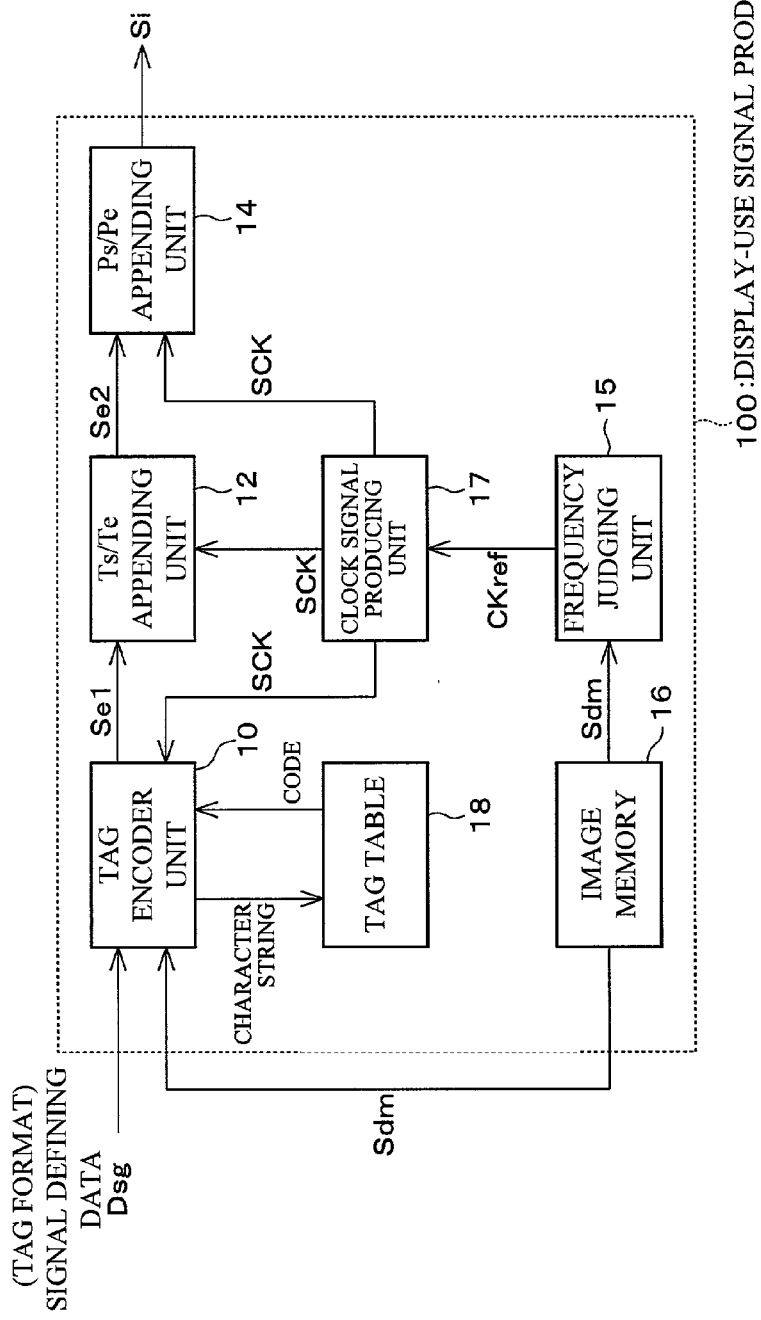
FIG. 23 is a block diagram showing the constitution of a display-use signal producing device which operates with a digital display data signal.

FIG. 23 is a block diagram the constitution of a display-use signal producing device 100 based on the present embodiment, when a display-use image signal Si is to be produced for digital drive use. The constitution of the display-use signal producing device 100 does not differ significantly between digital drive and analog drive: as shown in FIG. 23, no differences exist except that the signal level judging unit 11 discussed in relation to analog drive is replaced by the frequency judging unit 15, and the electric potential level specifying unit 13 by a clock signal producing unit 17. The constitution is otherwise unchanged, and will not be described further.

The signal frequency judging unit 15 detects the frequency of the image data prerecorded in the image memory 16 and determines a reference frequency CKref.

The clock signal producing unit 17 produces a clock signal which is used in producing the component signals of the control information signal. Under these conditions, the clock signal producing unit 13 produces a clock signal based on the reference frequency CKref determined by the signal frequency judging unit 15, so that the frequency of the control information signal is higher (or lower) than that of the image data prerecorded in the image memory 16.

Thereafter, similarly to the foregoing case of analog drive, in response to an input of image data Sdm (see FIG. 24(a)) read out from the image memory 16, the tag encoder unit 10 outputs the first encoder signal Se1 (see FIG. 24(b)), the Ts/Te appending unit 12 outputs the second encoder signal Se2 (see FIG. 24(c)), and the Ps/Pe appending unit 14 outputs the display-use image signal Si (see FIG. 24(d)).

The display-use image signal Si, whose structure is defined by means of the signal defining data Dsg, carries, as well as the display information representing the image to be displayed by the display device, control information (corresponding to control parameters) by which the method of displaying the image by the display device is controlled.

<2. Constitution of Display Device>

Figure 9:
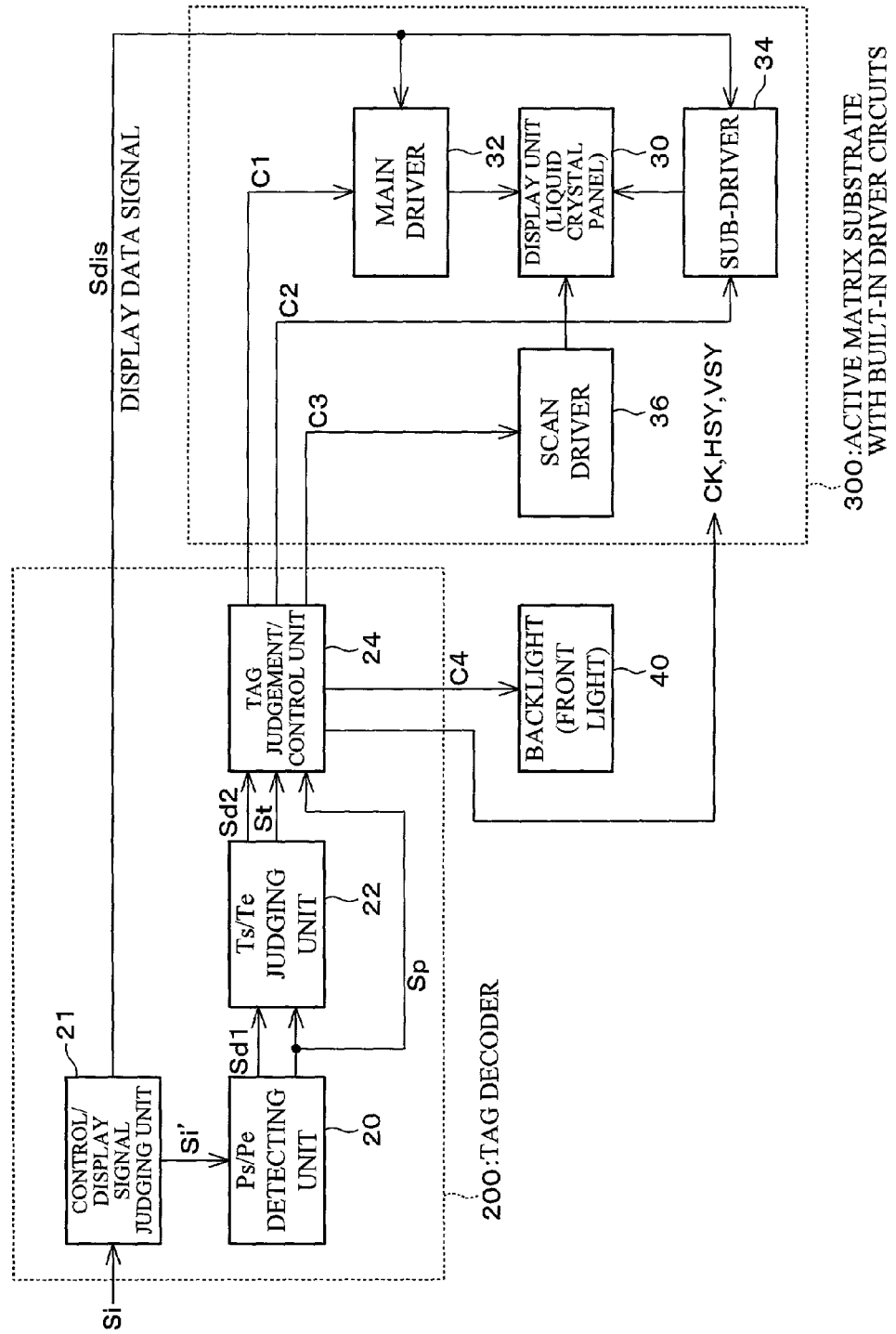
FIG. 9 is a block diagram showing the constitution of a display device in accordance with the embodiment.

FIG. 9 is a block diagram showing the constitution of a display device for implementing a control method in accordance with the present embodiment (hereinafter, will be referred to as a "display device based on the present embodiment"). The display device is fed with the display-use image signal Si produced by the display-use signal producing device to produce an image from the display data contained in that input signal Si on a liquid crystal panel, and includes a liquid crystal panel 30 as a display unit, a main driver 32 and sub-driver 34 as a data driver (data driver circuit), a scan driver (scan driver circuit) 36, a backlight 40, and a tag decoder 200. The tag decoder 200 includes a control/display signal judging unit 21, a Ps/Pe detecting unit 20, a Ts/Te judging unit 22, and a tag judgement/control unit 24, and derives a control information signal (a control parameter signal and a parameter start signal Ps and a parameter end signal Pe flanking it) from the input signal Si and produces, based on the control information signal, control signals C1 to C4 by which various sections of the display device are controlled. The display device is a active matrix liquid crystal display device, constructed around polysilicon TFTs (Thin Film Transistors), with built-in driver circuits. The display unit 30, the main driver 32, the sub-driver 34, and the scan driver 36 are provided as an active matrix substrate 300 with built-in driver circuits. However, the present invention is not limited to such display devices and is equally applicable to other display devices including those based on a cathode ray tube (CRT).

In the tag decoder 200 in the display device based on the present embodiment, the control/display signal judging unit 21 identifies and separates the control information signal and the display data signal from the display-use image signal Si produced by the display-use signal producing device, with the control information signal sent to the Ps/Pe detecting unit 20 and the display data signal to the main driver 32 and the sub-driver 34. The method is discussed separately for each case of analog and digital drive.

(Analog Drive: When Display Data is Analog Signal.)

As to analog drive, the control/display signal judging unit 21 compares the display-use image signal Si produced by the display-use signal producing device 100 with the reference electric potential level Vref determined by the display-use signal producing device 100. If the reference electric potential level Vref is determined based on the minimum electric potential level of a display data signal, the control/display signal judging unit 21 designates those parts of the display-use image signal Si which are lower than the reference electric potential level Vref as the control information signal and those which are higher as the display data signal. The method of identifying the control information signal and the display data signal in the display-use image signal Si produced by the display-use signal producing device 100 is not limited to the aforementioned method. If the reference electric potential level Vref is determined based on the maximum electric potential level of the display data signal, settings may be made so as to designate those parts which are higher than the reference electric potential level Vref as a control information signal and those which are lower as a display data signal.

(Digital Drive: When Display Data is Digital Signal.)

As to digital drive, the control/display signal judging unit 21 compares the display-use image signal Si produced by the display-use signal producing device 100 with the reference clock signal CKref and designates those parts of the display-use image signal Si which have a higher frequency than that of the reference clock signal CKref as the control information signal and those which have a lower frequency as the display data signal.

Now, the processing of the control information signal separated from the display-use image signal Si for output to the Ps/Pe detecting unit 20 will be described.

Figure 10:
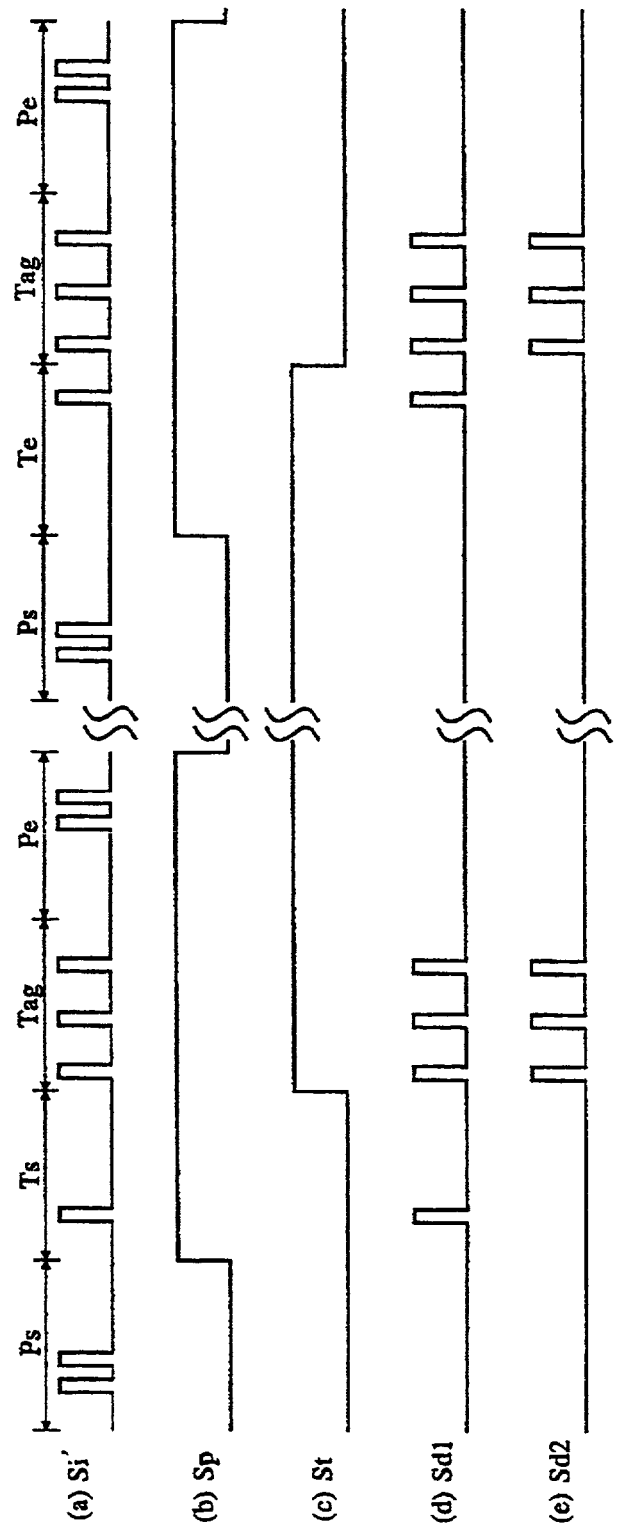
FIG. 10(a) to FIG. 10(e) are timing charts illustrating functions of a tag decoder in the display device in accordance with the embodiment.

The Ps/Pe detecting unit 20, holding a code "011000" representing the parameter start signal Ps and a code "000110" representing the parameter end signal Pe, compares the codes with the input signal Si' (That is, control information signal. See FIG. 10(a)) of the Ps/Pe detecting unit 20 for every predetermined number of bits (every 6 bits in the present embodiment) to detect the parameter start signal Ps and the parameter end signal Pe included in the input signal Si', and functions according to the detection results as follows: The Ps/Pe detecting unit 20 outputs a HIGH (high level) parameter detection signal Sp if the parameter start signal Ps is detected in the input signal Si' and a LOW (low level) parameter detection signal Sp if the parameter end signal Pe is detected in the input signal Si'. As shown in FIG. 10(b), the parameter detection signal Sp stays HIGH since the parameter start signal Ps is detected in the input signal Si' till the parameter end signal Pe is subsequently detected and stays LOW since the parameter end signal Pe is detected in the input signal Si' till the parameter start signal Ps is subsequently detected. Upon detection of the parameter start signal Ps or the parameter end signal Pe, the Ps/Pe detecting unit 20 outputs as a first decoder signal Sd1 a signal produced by separating the detected signal Ps or Pe from the input signal Si'. Thus, the first decoder signal Sd1 shown in FIG. 10(d) is obtained.

The first decoder signal Sd1 and the parameter detection signal Sp, which are outputs from the Ps/Pe detecting unit 20, are fed to the Ts/Te judging unit 22. When the parameter detection signal Sp changes from LOW to HIGH, a control parameter signal (hereinafter, will be referred to as a "present control parameter signal") is provided in a division of the first decoder signal Sd1 which comes immediately after the parameter detection signal Sp goes HIGH. The Ts/Te judging unit 22, holding a code "010000" representing the start tag signal Ts and a code "000010" representing the end tag signal Te, compares with the codes the predetermined number of leading bits (6 bits in the present embodiment) of the present control parameter signal so as to determine whether the present control parameter signal indicates the start or end of the control. The Ts/Te judging unit 22 then operates according to the detection results as follows: If the first 6 bits of the present control parameter signal matches the code representing the start tag signal Ts, since the present control parameter signal indicates the start of the control, the Ts/Te judging unit 22 outputs a HIGH start/end identification signal St; if the first 6 bits of the present control parameter signal matches the code representing the end tag signal Te, since the present control parameter signal indicates the end of the control, the Ts/Te judging unit 22 outputs a LOW start/end identification signal St. As shown in FIG. 10(c), the start/end identification signal St stays HIGH since the control parameter signal indicating the start of the control is detected in the input signal Si' till the control parameter signal indicating the end of the control is subsequently detected and stays LOW since the control parameter signal indicating the end of the control is detected in the input signal Si' till the control parameter signal indicating the start of the control is subsequently detected. When the parameter detection signal Sp is HIGH, the Ts/Te judging unit 22 outputs as a second decoder signal Sd2 a signal produced by stripping the first decoder signal Sd1 of the start tag signal Ts or the end tag signal Te which are the first 6 bits of the present control parameter signal; when the parameter detection signal Sp is LOW, the Ts/Te judging unit 22 outputs the incoming first decoder signal Sd1 per se as the second decoder signal Sd2. Thus, the second decoder signal Sd2 shown in FIG. 10(e) is obtained.

The second decoder signal Sd2 and the start/end identification signal St, which are outputs from the Ts/Te judging unit 22, are fed to the tag judgement/control unit 24 together with the parameter detection signal Sp which is the output from the Ps/Pe detecting unit 20. The tag judgement/control unit 24 derives the control tag signal Tag from the second decoder signal Sd2 based on the parameter detection signal Sp. In other words, as shown in FIGS. 10(a), 10(b), the start tag signal Ts or the end tag signal Te, the control tag Tag, and the parameter end signal Pe appears in this order in divisions of the input signal Si' which correspond to periods in which the parameter detection signal Sp is HIGH. Since the start tag signal Ts, the end tag signal Te, and the parameter end signal Pe have a fixed length (6 bits) the parameter detection signal Sp dictates a division for the control tag signal Tag. Thus, irrespective of whether the control tag signal Tag has a fixed or variable length, the tag judgement/control unit 24 is able to derive the control tag Tag from the second decoder signal Sd2 based on the parameter detection signal Sp. Based on the thus derived control tag Tag and the start/end identification signal St, the tag judgement/control unit 24 produces the first to fourth control signals C1 to C4 by which various parts of the present display device are controlled. In other words, the tag judgement/control unit 24 contains a control decoder for decoding the control tag signal Tag represented by the code shown in FIG. 3, and the control decoder selects one of the control signals C1 to C4 in accordance with the control tag signal Tag derived from the second decoder signal Sd2 and set the selected control signal Cj to either HIGH or LOW in accordance with the start/end identification signal St. Note that when the control tag signal Tag corresponds to "frm_rate", the control decoder changes repetition frequency of timing signals (clock signal CK, horizontal synchronous signal HSY, vertical synchronous signal VSY, which will be detailed later) fed to the main driver 32, the sub-driver 34, the scan driver 36, etc., as well as the level of the control signal C3 fed to the scan driver 36, so as to change the frame frequency between a default value and another value.

For example, when the input signal Si' is carrying a control parameter signal corresponding to "drv_m", its control tag signal Tag is "101010", and the control decoder accordingly selects the first control signal C1 which is the control signal for the main driver 32. In this situation, the start/end identification signal St is HIGH, and the select control signal C1 is set to HIGH, setting the main driver 32 to operating state. Thereafter, when the tag decoder 200 receives an input of the input signal Si' carrying a control parameter signal corresponding to "/drv_m", the control decoder in the tag judgement/control unit 24 select the control signal C1 by which the main driver 30 is controlled. Since the start/end identification signal St is LOW, the selected control signal C1 is set to LOW, thereby setting the main driver 32 to non-operating state as to the display unit 30.

In response to those control parameter signals corresponding to "disp" and "/disp" contained in the input signal Si', the tag judgement/control unit 24 outputs a signal which appears in the division flanked by these control parameter signals in the aforementioned display-use image signal Si at a predetermined timing as a display data signal Sdis representing the image to be displayed by the display unit 30, while maintaining the signal level of the control signals C1 to C4. However, the display data signal Sdis is not contained in the input signal Si', but separated from the display-use image signal Si in the control/display signal judging unit 21. Therefore, the control/display signal judging unit 21 has built-in display memory for temporarily storing the display data signal Sdis as current display data and repeatedly outputs the current display data stored in the display memory as a display data signal Sdis a predetermined number of times or for a predetermined period. The display data signal Sdis thus output is fed to the main driver 32 and the sub-driver 34. Further, the tag judgement/control unit 24 produces a clock signal CK, a horizontal synchronous signal HSY, and a vertical synchronous signal VSY as timing signals based on which the display unit 30 displays the image represented by the display data signal Sdis. The timing signals are fed to the main driver 32, the sub-driver 34, and the scan driver 36. Note that the control signal is changed between levels based on a control parameter signal which succeeds the control parameter signal corresponding to "/disp", for example, the control signal C1 for the main driver 32 is changed from HIGH to LOW based on a succeeding control parameter "/drv_m", after the display data signal Sdis is output completely for a predetermined number of times or a predetermined period.

The display unit 30, which is a liquid crystal panel, includes scan signal lines corresponding respectively to horizontal scan lines in the image represented by the display data signal Sdis fed from the control/display signal judging unit 21, data signal lines intersecting the scan signal lines, and a pixel array made of pixel forming means provided at intersections of the scan signal lines and the data signal lines. Each pixel forming means has a structure to apply the voltage in accordance with the image signal fed to the data signal line to fine liquid crystal layer part.

The main driver 32 receives the display data signal Sdis representing the image to be displayed by the display unit 30 and the clock signal CK and the horizontal synchronous signal HSY as timing indicating signals, and also receives the first control signal C1 produced by the tag judgement/control unit 24. The main driver 32 is in enabled state (operating state) when the first control signal C1 is HIGH. Under the circumstances, the main driver 32 produces an image signal by which the liquid crystal panel is driven (hereinafter, will be referred to as a drive-use image signal) based on the display data signal Sdis, the clock signal CK, and the horizontal synchronous signal HSY and applies the drive-use image signal to the data signal lines of the display unit 30. Meanwhile, when the first control signal C1 is LOW, the main driver 32 is in disabled state (non-operating state) and stops applying the drive-use image signal to the data signal lines of the display unit 30.

As with the main driver 32, the sub-driver 34 also receives the display data signal Sdis representing the image to be displayed by the display unit 30 and the clock signal CK and the horizontal synchronous signal HSY as timing representing signals, as well as the second control signal C2 produced by the tag judgement/control unit 24. When the second control signal C2 is HIGH, the sub-driver 34 changes to enabled state and produces a drive-use image signal by which the liquid crystal panel, i.e. the display unit 30, is driven based on the display data signal Sdis, the clock signal CK, and the horizontal synchronous signal HSY, applying the resultant drive-use image signal to the data signal lines of the display unit 30. Meanwhile, when the second control signal C2 is LOW, the sub-driver 34 changes to disabled state and stops applying the drive-use image signal to the data signal lines of the display unit 30.

The sub-driver 34 shares the data signal lines of the display unit 30 with the main driver; however, at least one of the output terminals of the main driver 32 and the sub-driver 34 which are connected to the shared data signal lines is controlled at each point in time so as to be in a high impedance state even when the first control signal C1 fed to the main driver 32 and the second control signal C2 fed to the sub-driver 34 are both HIGH. In other words, arrangement is made so that the drive-use image signal applied by the main driver 32 does not collide with the drive-use image signal applied by the sub-driver 34 (the constitution to realize this is not directly related to the present invention, and details are omitted).

The scan driver 36 is fed with the horizontal synchronous signal HSY and the vertical synchronous signal VSY as timing signals by which the display unit 30 displays the image represented by the display data signal Sdis, and also with the third control signal C3 produced by the tag judgement/control unit 24. The scan driver 36 produces a scan signal to be applied to the scan signal lines based on the horizontal synchronous signal HSY, the vertical synchronous signal VSY, and the third control signal C3 so that the scan signal lines of the display unit 30 are selected sequentially for each horizontal scan period. The selection of the scan signal lines is performed every vertical scan period. Under these circumstances, if the third control signal C3 is HIGH, the scan driver 36 produces the scan signals so that the scan signal lines are selectively scanned at a predefined frame frequency which differs from the default value. Meanwhile, if the third control signal C3 is LOW, the scan driver 36 produces the scan signals so that the scan signal lines are selectively scanned at a frame frequency already determined (default value).

Hence, as to the liquid crystal panel as the display unit 30, the data signal lines are fed with the drive-use image signal based on the display data signal Sdis from the main driver 32 and the sub-driver 34 and the scan signal lines is fed with the scan signal by the scan driver 36. Thus, the display unit 30 displays the image represented by the display data carried on the display-use image signal Si by the display method specified by means of the control parameter signal contained in the display-use image signal Si.

In the constitution shown in FIG. 9, the tag decoder unit 200 first separates the display-use image signal Si into the display data signal Sdis and the control information signal (input signal Si'). The present invention is however not limited to this. For example, the control/display signal judging unit 21 may be omitted from FIG. 9, with the Ps/Pe detecting unit 20, the Ts/Te judging unit 22, and the tag judging/controlling unit 24 detecting the component signals of the control information signal to produce the control signals C1 to C4 and also removing the detected signals from the display-use image signal Si from which the display data signal Sdis is not first separated. In this case, removing the component signals of the control information signal from the display-use image signal Si leaves only the display data signal Sdis when the display-use image signal Si reaches finally at the tag judging/controlling unit 24 which outputs the display data signal Sdis, thereby achieving the same purpose as the above constitution.

<3. Operation of Display Device>

The following will describe, as an example, an operation of the display device based on the present embodiment constituted as in the foregoing.

<3.1 First Operation Example>

First, the display operation when the display-use image signal Si produced in accordance with the signal defining data Dsg shown in FIGS. 5(a) and 5(b) is fed as an input signal to the display device (FIG. 9) based on the present embodiment will be discussed as the first operation example.

The signal defining data Dsg shown in FIG. 5(a) defines the structure of a signal by which the display unit 30 displays the image represented by the image data identified by "img.gif". As the signal defining data Dsg is fed to the aforementioned display-use signal producing device 100 (FIG. 1), the display-use image signal Si shown in FIG. 11 is produced and supplied to the tag decoder 200 inside the display device.

As the display-use image signal Si shown in FIG. 11 is supplied to the tag decoder 200, a main driver control start tag which is an equivalent to a parameter set instructing that the main driver 32 be set to enabled state (operating state), in other words, a train of a parameter start signal Ps, a start tag signal Ts, a main driver control tag signal Drv_m, and a parameter end signal Pe, is detected. Specifically, first, the Ps/Pe detecting unit 20 detects the parameter start signal Ps contained in the display-use image signal Si. As mentioned in the foregoing, when the display data is an analog signal, since the level of the part of the signal corresponding to the display data is specified higher (or lower) than the level of the digital signal corresponding to the tag, the parameter start signal Ps and the parameter end signal Pe are safely detected in the display-use image signal Si. When the display data is a digital signal, since the frequency of the part of the signal corresponding to the display data is specified higher (or lower) than the frequency of the digital signal corresponding to the tag, the parameter start signal Ps and the parameter end signal Pe are safely detected in the display-use image signal Si. As the parameter start signal Ps is detected, the Ts/Te judging unit 22 judges whether the signal succeeding the parameter start signal Ps is a tag start signal Ts or a tag end signal Te. Here, judgement is such that the signal succeeding the parameter start signal Ps is a tag start signal Ts, and the signal succeeding the tag start signal Ts is fed to the tag judgement/control unit 24. In the meantime, the Ps/Pe detecting unit 20 detects a parameter end signal Pe corresponding to the detected parameter start signal Ps. The tag judgement/control unit 24 derives a control tag signal Tag from the control parameter signal provided between the parameter start signal Ps thus detected and the parameter end signal Pe. Under these circumstances, the derived control tag signal Tag is a control tag signal Drv_m corresponding to the main driver control tag "drv_m", and the tag judgement/control unit 24 specifies the first control signal C1 which is to be fed to the main driver 32 to HIGH based on the control tag signal Drv_m and the judgement made by the Ts/Te judging unit 22. This initiates the control by the main driver 32, or in other words, the main driver 32 switches to enabled state (operating state).

Next, a display start tag corresponding to a parameter set representing a starting point for display data carried on the display-use image signal Si, or in other words, a train of a parameter start signal Ps, a start tag signal Ts, a display tag signal Disp, and a parameter end signal Pe are detected. Specifically, the Ps/Pe detecting unit 20 detects a parameter start signal Ps contained in the display-use image signal Si, the Ts/Te judging unit 22 subsequently makes a judgement that the signal succeeding the parameter start signal Ps is a tag start signal Ts, and the signal succeeding the tag start signal Ts is fed to the tag judgement/control unit 24. In the meantime, the Ps/Pe detecting unit 20 detects a parameter end signal Pe corresponding to the detected parameter start signal Ps. The tag judgement/control unit 24 derives a control tag signal Tag from the control parameter signal provided between the parameter start signal Ps thus detected and the parameter end signal Pe, and makes a judgement that the control tag signal Tag is the control tag signal Disp corresponding to the display tag "disp". Thus, the detection of a train of display start tags is completed, and therefore the signal succeeding the display start tag is derived as the display data signal Sdis. The display data signal Sdis is temporarily stored in the display memory inside the tag judgement/control unit 24 and then read out at a predetermined timing from the memory or directly fed to the main driver 32 and the sub-driver 34. Here, the display data signal Sdis is fed to the main driver 32 and the sub-driver 34 together with the timing signals (clock signal CK, horizontal synchronous signal HSY, vertical synchronous signal VSY, etc.) by which the display unit 30 displays the image represented by the display data signal Sdis.

Since the main driver 32 is in enabled state due to the main driver control tag, upon the reception of the display data signal Sdis together with the timing signals, the main driver 32 produces a drive-use image signal by which the display unit 30 displays the image represented by the display data signal Sdis and applies the produced signal to the data signal lines of the display unit 30. This initiates the image display by the display unit 30. In this operation example, since the control of the sub-driver 34 is not started (the sub-driver 34 is not in enabled state), the sub-driver 34 does not respond, and thus disregards, the display data signal Sdis.

In this manner, the display start tag is detected, and while the display data signal Sdis is being derived from the display-use image signal Si, the tag decoder 200 detects a display end tag corresponding to a parameter set indicating the end point of the display data contained in the display-use image signal Si, that is, a train of a parameter start signal Ps, an end tag signal Te, a display tag signal Disp, and a parameter end signal Pe. Specifically, the Ps/Pe detecting unit 20 first detects the parameter start signal Ps contained in the display-use image signal Si, and then the Ts/Te judging unit 22 makes a judgement that the signal succeeding the parameter start signal Ps is a tag end signal Te. The signal succeeding the tag end signal Te is fed to the tag judgement/control unit 24. In the meantime, the Ps/Pe detecting unit 20 detects a parameter end signal Pe corresponding to the detected parameter start signal Ps. The tag judgement/control unit 24 thus derives the control tag signal Tag from the control parameter signal provided between the parameter start signal Ps thus detected and the parameter end signal Pe, and makes a judgement that the control tag signal Tag is a display tag Disp. This amounts to the detection of the series of display end tags, and the derivation of the display data signal Sdis from the display-use image signal Si is ended immediately before the display end tag.

After the detection of the display end tag, the tag decoder 200 detects a main driver control end tag corresponding to a parameter set instructing that the main driver 32 be set in disabled state (non-operating state), that is, a train of a parameter start signal Ps, an end tag signal Te, a main driver tag Drv_m, and a parameter end signal Pe. Specifically, the Ps/Pe detecting unit 20 first detects the parameter start signal Ps contained in the display-use image signal Si, and then the Ts/Te judging unit 22 makes a judgement that the signal succeeding parameter start signal Ps is a tag end signal Te, and the signal succeeding the tag end signal Te is fed to the tag judgement/control unit 24. In the meantime, the Ps/Pe detecting unit 20 detects a parameter end signal Pe corresponding to the detected parameter start signal Ps. The tag judgement/control unit 24 derives the control tag signal Tag from the control parameter signal provided between the parameter start signal Ps thus detected and the parameter end signal Pe, and makes a judgement that the control tag signal Tag is a control tag signal Drv_m corresponding to a main driver control tag "drv_m". The tag judgement/control unit 24 specifies the first control signal C1 fed to the main driver 32 to LOW based on the control tag signal Drv_m and the judgement made by the Ts/Te judging unit 22. This ends the control of the main driver 32 and the main driver 32 switches to disabled state (non-operating state).

Meanwhile, the signal defining data Dsg shown in FIG. 5(*b*) defines the structure of a signal by which the sub-driver 34 displays on the display unit 30 an image represented by the image data specified by "txt. bmp". Upon the input of the signal defining data Dsg to the aforementioned display-use signal producing device 100, the display-use image signal Si shown in FIG. 12 is produced and fed to the tag decoder 200 inside the display device.

Figure 12:
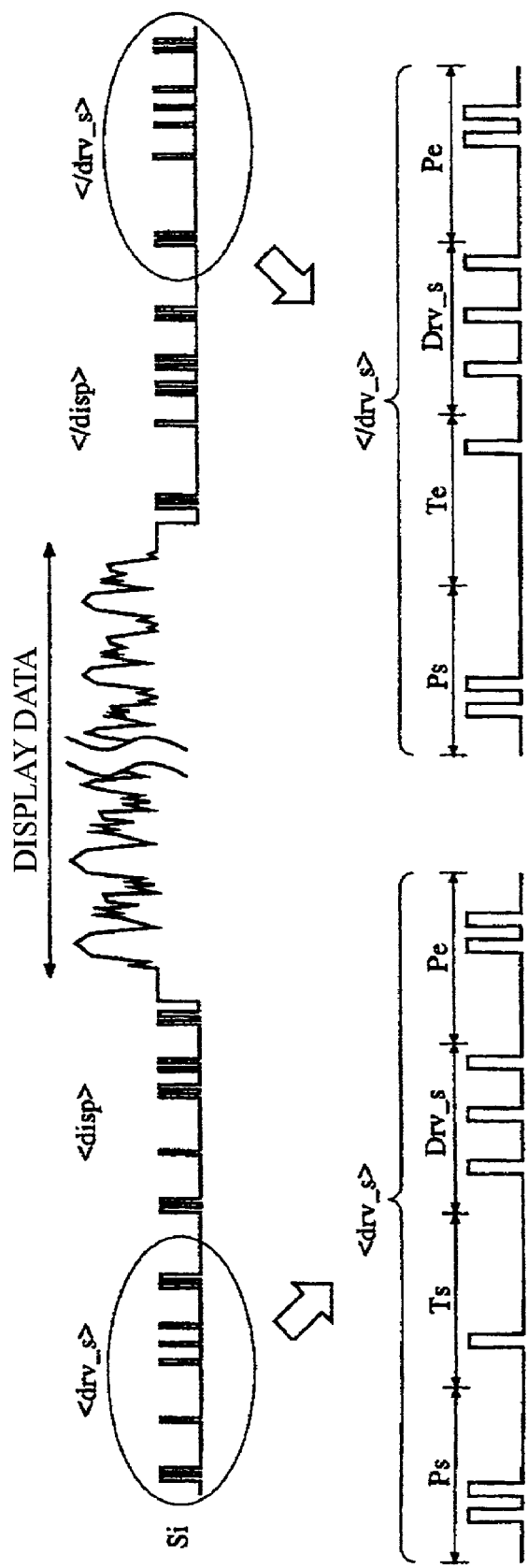
FIG. 12 shows signal waveform charts illustrating a first operation example of a display device in accordance with the embodiment.

Upon the input of the display-use image signal Si shown in FIG. 12 as an input signal into the tag decoder 200, similarly to the foregoing, the tag decoder 200 first detects a sub-driver control start tag corresponding to a parameter set instructing that the control of the sub-driver 34 be started, or in other words, a train of a parameter start signal Ps, a start tag signal Ts, a sub-driver control tag signal Drv_s, and a parameter end signal Pe. Based on such detection of the sub-driver control start tag, the tag judgement/control unit 24 specifies the second control signal C2 fed to the sub-driver 34 to HIGH. This starts the control of the sub-driver 34, or in other words, the sub-driver 34 switches to enabled state (operating state).

Next, the tag decoder 200 detects a display start tag corresponding to a parameter set indicating the starting point for the display data, or in other words, a train of a parameter start signal Ps, a start tag signal Ts, a display tag signal Disp, and a parameter end signal Pe. Based upon the detection, the tag judgement/control unit 24 derives the signal succeeding the display start tag as a display data signal Sdis and feeds the extracted signal to the main driver 32 and the sub-driver 34 at a predetermined timing. Here, the display data signal Sdis is fed to the main driver 32 and the sub-driver 34 together with timing signals (clock signal CK, horizontal synchronous signal HSY, vertical synchronous signal VSY, etc.) by which the display unit 30 displays the image represented by the display data signal Sdis.

Since the sub-driver 34 is in enabled state due to the sub-driver control tag, upon the reception of the display data signal Sdis together with the timing signals, the sub-driver 34 produces a drive-use image signal by which the display unit 30 displays the image represented by the display data signal Sdis and applies the produced signal to the data signal lines of the display unit 30. This starts the image display by the display unit 30. In this operation example, since the control of the main driver 32 is not started (the main driver 32 is not in enabled state), the main driver 32 does not respond, and thus disregards, the display data signal Sdis.

In this manner, the display start tag is detected, and while the display data signal Sdis is being derived from the display-use image signal Si, the tag decoder 200 detects a display end tag corresponding to a parameter set indicating the end point of the display data contained in the display-use image signal Si, that is, a train of a parameter start signal Ps, an end tag signal Te, a display tag signal Disp, and a parameter end signal Pe. This ends the derivation of the display data signal Sdis from the display-use image signal Si.

After the detection of the display end tag, the tag decoder 200 detects a sub-driver control end tag corresponding to a parameter set instructing that the sub-driver 34 be set to enabled state (operating state), or in other words, a train of a parameter start signal Ps, an end tag signal Te, a sub-driver control tag signal Drv_s, and a parameter end signal Pe. Based on the detection of the sub-driver control end tag, the tag judgement/control unit 24 set the second control signal C2 fed to the sub-driver 34 to LOW. This ends the control of the sub-driver 34, or in other words, the sub-driver 34 switches to disabled state (non-operating state).

As discussed in the first operation example, the image represented by the display data sandwiched between "<drv_m>" and "</drv_m>" in the signal definition is displayed by the main driver 32 driving the display unit 30 (see FIG. 5(a)). Further, the image represented by the display data sandwiched between "<drv_s>" and "</drv_s>" in the signal definition is displayed by the sub-driver 34 driving the display unit 30 (FIG. 5(b)). By doing this, in the first operation example, only one of the main driver 32 and the sub-driver 34 switches to operating state. However, a start tag and/or an end tag may be inserted before the end tag which is to be paired with the start tag appears in the signal definition. In other words, for example, as shown in FIG. 6(a), "<drv_s>" and "</drv-s>" indicating the start and end of the control of the sub-driver 34 may be inserted between "<drv_m>" and "</drv_m>" indicating the start and end of the control of the main driver 32. Using such signal defining data, the sub-driver 34 is capable of driving the display unit 30, while the main driver 32 is also driving the display unit 30. In other words, using the signal defining data shown in FIG. 6(a), a text, "text characters," can be displayed overlapping the image represented by the image data identified by the "img.gif" as shown in FIG. 6(b). By doing this, for example, in a television set, a text, such as a subtitle, can be displayed on screen overlapping the currently displayed video image, by displaying the video image using the main driver 32 and the text using the sub-driver 34. Note that, as would be understood from the foregoing, the data corresponding to the part sandwiched between "<disp>" and "</disp>" indicating respectively the starting point and the end point of the display data in the signal definition is reflected in the display content and also that the tags themselves are reflected in the control of the display method, but not in the display content (displayed image).

The above description concerned the case where two drivers, i.e. the main driver 32 and the sub-driver 34, are connected to data signal lines as data drivers which are data driver circuits in the display unit 30 which is a liquid crystal panel. Display control can be performed by a similar method also when three or more data drivers are connected to the data signal lines. To control three or more drivers, for example, Drv_1, Drv_2, ..., and Drv_n may be used as tags by which the first, second, ..., and n-th drivers are controlled. Further, by providing appropriate control tags in a similar manner when there are more than one scan driver which is a driver circuit driving the scan signal lines of the display unit 30, controlling the scan drivers by a similar method provides a means to control the display method.

<3.2 Second Operation Example>

Figures 6, 7, 8:
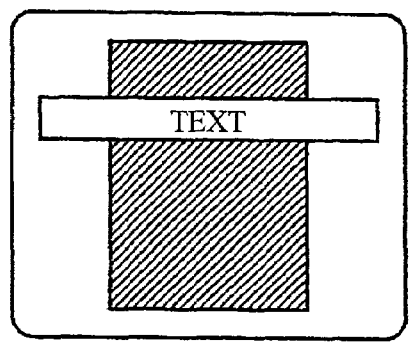
FIG. 7 shows a fourth example of signal defining data used in the embodiment.
FIG. 8 shows a fifth example of signal defining data used in the embodiment.

Now, the display operation when the display-use image signal produced in accordance with the signal defining data shown in FIG. 7 is fed as the display-use image signal Si to the display device (FIG. 9) based on the present embodiment will be discussed as the second operation example. Note that in the signal defining data in FIG. 7 the part sandwiched between "/*" and "*/" is a remark.

Figure 13:
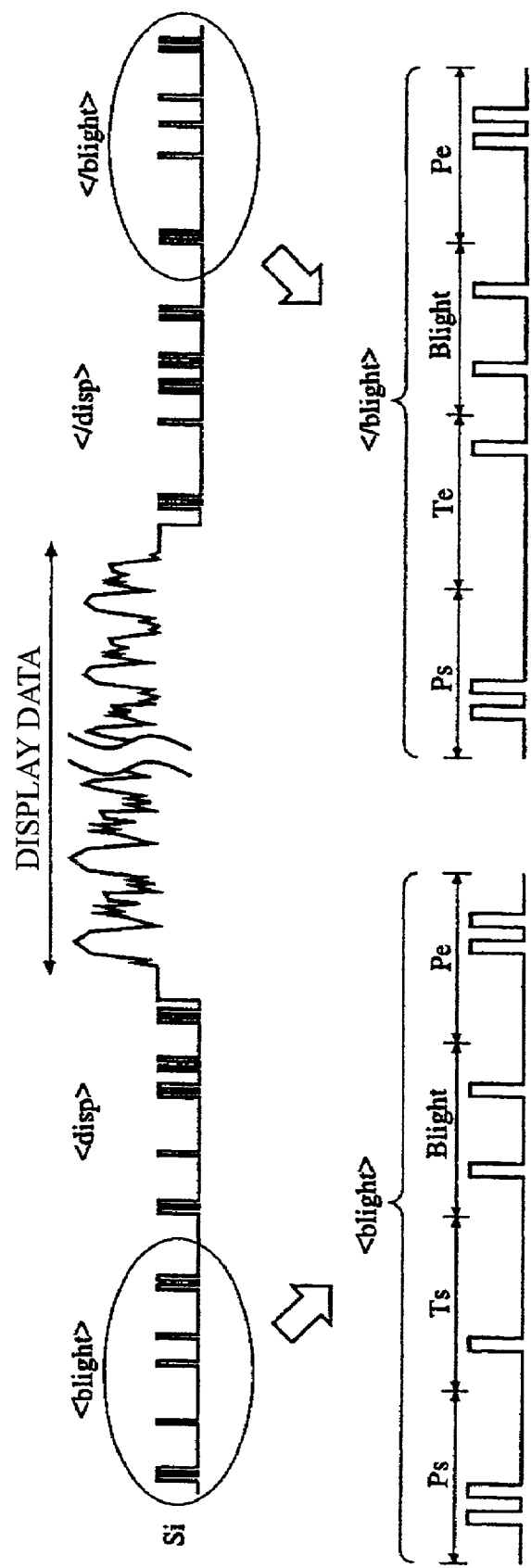
FIG. 13 shows signal waveform charts illustrating a second operation example of a display device in accordance with the embodiment.

The signal defining data in FIG. 7 also defines structure of a signal by which the display unit 30 displays the image represented by the image data identified by "img.gif" using the main driver 32 as in the first operation example, but differs from the first operation example in FIG. 5(a) in that a control tag to control the backlight 40 is contained. Therefore, in the display-use image signal produced when the signal defining data is fed to a display-use signal producing device 100, the signal part which corresponds to the division from a backlight control start tag "<blight>" to a backlight control end tag "</blight>", that is, the signal part shown in FIG. 13, is substituted for the signal part which corresponds to the division from a display start tag "<disp>" to a display end tag "</disp>" in the display-use image signal shown in FIG. 11 of the first operation example.

As the display-use image signal Si is fed as an input signal to the tag decoder 200, as in the first operation example, the tag decoder 200 first detects a main driver control start tag corresponding to a parameter set instructing that the main driver 32 be set to enabled state, or in other words, a train of a parameter start signal Ps, a start tag signal Ts, a main driver control tag signal Drv_m, and a parameter end signal Pe. Next, the tag decoder 200 detects a backlight control start tag corresponding to a parameter set instructing that a backlight 40 start to turn on, or in other words, a train of a parameter start signal Ps, a start tag signal Ts, a backlight control tag signal Blight, and a parameter end signal Pe. As would be understood from FIG. 13, in the detection of the backlight control start tag, the Ps/Pe detecting unit 20 first detects the parameter start signal Ps contained in the display-use image signal Si, and the Ts/Te judging unit 22 makes a judgement that the signal succeeding the parameter start signal Ps is the tag start signal Ts. The signal succeeding the tag start signal Ts is fed to the tag judgement/control unit 24. In the meantime, the Ps/Pe detecting unit 20 detects the parameter end signal Pe corresponding to the detected parameter start signal Ps. The tag judgement/control unit 24 derives the control tag signal Tag from the control parameter signal provided between the thus detected parameter start signal Ps and parameter end signal Pe and makes a judgement that the control tag signal Tag is the control tag signal Blight corresponding to a backlight control tag "blight." The tag judgement/control unit 24 sets the fourth control signal C4 fed to the backlight 40 to HIGH based on the control tag signal Blight and the judgement made by the Ts/Te judging unit 22. This starts the turning on of the backlight 40.

Next, the tag decoder 200 detects a display start tag corresponding to a parameter set indicating the starting point of the display data, or in other words, a train of a parameter start signal Ps, a start tag signal Ts, a display tag signal Disp, and a parameter end signal Pe. Based on the detection, the tag judgement/control unit 24 derives the signal succeeding the display start tag as the display data signal Sdis and feeds the derived signal to the main driver 32 and the sub-driver 34 at a predetermined timing. Here, the display data signal Sdis is fed to the main driver 32 and the sub-driver 34 together with timing signals (clock signal CK, horizontal synchronous signal HSY, vertical synchronous signal VSY, etc.) by which the display unit 30 displays the image represented by the display data signal Sdis. Based on these signals, the main driver 32 produces a drive-use image signal and applies the produced signal to the data signal lines of the display unit 30. Thus, the display unit 30 displays the image represented by the display data signal Sdis. Note that in this operation example the control of the sub-driver 34 is not started; the sub-driver 34 is in non-operating state and does not respond to the display data signal Sdis.

While the display start tag is detected in this manner and the display data signal Sdis is derived from the display-use image signal Si, the tag decoder 200 detects a display end tag corresponding to a parameter set indicating the end point of the display data contained in the display-use image signal Si, or in other words, a train of a parameter start signal Ps, an end tag signal Te, a display tag signal Disp, and a parameter end signal Pe. This ends the derivation of the display data signal Sdis from the display-use image signal Si.

After the detection of the display end tag, the tag decoder 200 detects a backlight control end tag corresponding to a parameter set instructing that the backlight 40 be turned off, or in other words, a train of a parameter start signal Ps, an end tag signal Te, a backlight control tag signal Blight, and a parameter end signal Pe. Based on the detection of the backlight control end tag, the tag judgement/control unit 24 sets the fourth control signal C4 fed to the backlight 40 to LOW. This ends the control of the backlight 40, or in other words, the backlight 40 turns off.

Finally, as in the first operation example, the tag decoder 200 detects a main driver control end tag corresponding to a parameter set instructing that the main driver 32 be switched to disabled state, or in other words, a train of a parameter start signal Ps, an end tag signal Te, a main driver control tag signal Drv_m, and a parameter end signal Pe. This switches the main driver 32 to non-operating state.

Note, when a front light is provided to the display unit 30, display devices are viable which are capable of controlling the turning on/off of the front light by preparing a control tag "flight" to control the turning on/off of the front light.

<3.3 Third Operation Example>

Now, the display operation when the display-use image signal produced in accordance with the signal defining data shown in FIG. 8 is fed as the display-use image signal Si to the display device (FIG. 9 in accordance with the present embodiment will be discussed as the third operation example. Note that in the signal defining data shown in FIG. 8, the part sandwiched between "/*" and "*/" is a remark.

Figure 14:
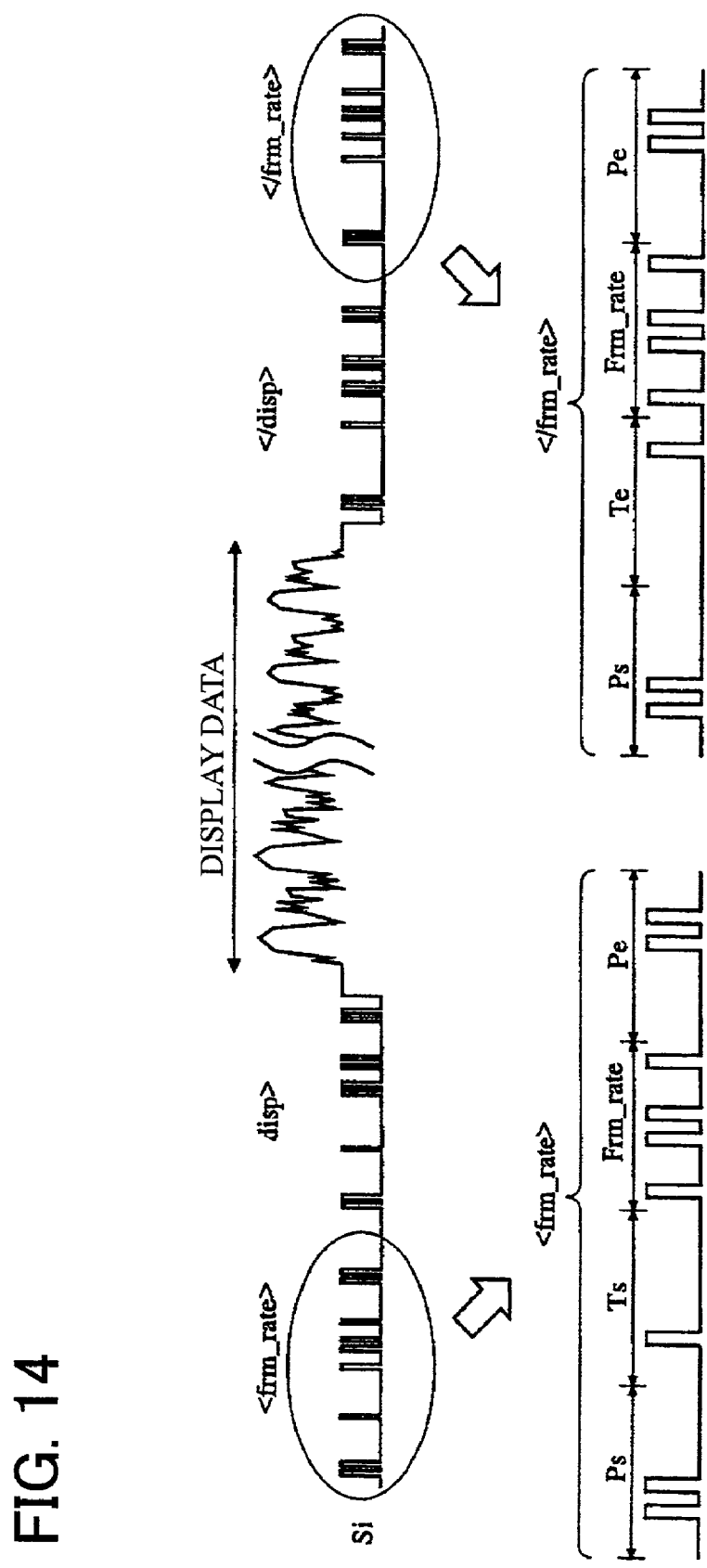
FIG. 14 shows signal waveform charts illustrating a third operation example of a display device in accordance with the embodiment.

The signal defining data shown in FIG. 8 defines the structure of a signal by which the display unit 30 displays the image represented by the image data identified by "img.gif" using the main driver 32 as in the first operation example, but differs from the first operation example shown in FIG. 5(a) in that a control tag to control a frame frequency is contained. Therefore, in the display-use image signal produced when the signal defining data is fed to a display-use signal producing device 100, the signal part corresponding to the division from a frame rate control start tag "<frm_rate>" to a frame rate control end tag "</frm_rate>", that is, the signal part shown in FIG. 14, is substituted for the signal part which corresponds to the division from a display start tag "<disp>" to a display end tag "</disp>" in the display-use image signal shown in FIG. 11 of the first operation example.

As the display-use image signal Si is fed as an input signal to the tag decoder 200, as in the first operation example, the tag decoder 200 first detects a main driver control start tag corresponding to a parameter set instructing that the main driver 32 be set to enabled state, or in other words, a train of a parameter start signal Ps, a start tag signal Ts, a main driver control tag signal Drv_m, and a parameter end signal Pe. Next, the tag decoder 200 detects a frame rate control start tag corresponding to a parameter set instructing that control be started so as to make the frame frequency equal to a predetermined value which differs from a default value, or in other words, a train of a parameter start signal Ps, a start tag signal Ts, a frame rate control tag signal Frm_rate, and a parameter end signal Pe. As would be understood from FIG. 14, in the detection of the frame rate control start tag, the Ps/Pe detecting unit 20 first detects the parameter start signal Ps contained in the display-use image signal Si, and the Ts/Te judging unit 22 makes a judgement that the signal succeeding the parameter start signal Ps is the tag start signal Ts. The signal succeeding the tag start signal Ts is fed to the tag judgement/control unit 24. In the meantime, the Ps/Pe detecting unit 20 detects the parameter end signal Pe corresponding to the detected parameter start signal Ps. The tag judgement/control unit 24 derives the control tag signal Tag from the control parameter signal provided between the thus detected parameter start signal Ps and parameter end signal Pe and makes a judgement that the control tag signal Tag is the control tag signal Frm_rate corresponding to the frame rate control tag "frm_rate". The tag judgement/control unit 24 sets the frame frequency to a predetermined value which is not equal to a default value by controlling the repetition frequency of the clock signal CK, the horizontal synchronous signal HSY, and the vertical synchronous signal VSY and setting the third control signal C3 fed to the scan driver 36 to HIGH based on the control tag signal Frm_rate and the judgement made by the Ts/Te judging unit 22.

Next, the tag decoder 200 detects a display start tag corresponding to a parameter set indicating the starting point of the display data, or in other words, a train of a parameter start signal Ps, a start tag signal Ts, a display tag signal Disp, and a parameter end signal Pe. Based on the detection, the tag judgement/control unit 24 derives the signal succeeding the display start tag as the display data signal Sdis and feeds the derived signal to the main driver 32 and the sub-driver 34 at a predetermined timing. Here, the display data signal Sdis is fed to the main driver 32 and the sub-driver 34 together with timing signals (clock signal CK, horizontal synchronous signal HSY, vertical synchronous signal VSY, etc.) by which the display unit 30 displays the image represented by the display data signal Sdis. Based on the signals, the main driver 32 produces a drive-use image signal and applies the produced signal to the data signal lines of the display unit 30. Further, based on the clock signal CK, the horizontal synchronous signal HSY, the vertical synchronous signal VSY, the third control signal C3, etc. fed from the tag judgement/control unit 24, the scan driver 36 produces a scan signal corresponding to a predetermined frame frequency which differs from a default value and applies the produced signal to the scan signal lines of the display unit 30. Thus, the display unit 30 displays the image represented by the display data signal Sdis at a predetermined frame frequency which differs from a default value. Note that in this operation example the sub-driver 34 is in non-operating state, and does not respond to the display data signal Sdis and other signals.

While the display start tag is detected in this manner and the display data signal Sdis is derived from the display-use image signal Si, the tag decoder 200 detects a display end tag corresponding to a parameter set indicating the end point of the display data contained in the display-use image signal Si, or in other words, a train of a parameter start signal Ps, an end tag signal Te, a display tag signal Disp, and a parameter end signal Pe. This ends the derivation of the display data signal Sdis from the display-use image signal Si.

After the detection of the display end tag, the tag decoder 200 detects a frame rate control end tag corresponding to a parameter set instructing that the control of the frame frequency be ended, or in other words, a train of a parameter start signal Ps, an end tag signal Te, a frame rate control tag signal Frm_rate, and a parameter end signal Pe. Based on the detection of the frame rate control end tag, the tag judgement/control unit 24 sets the control signal C3 fed to the scan driver 36 to LOW and the repetition frequency of the clock signal CK, the horizontal synchronous signal HSY, the vertical synchronous signal VSY to a value correspond to a default frame frequency.

Finally, as in the first operation example, the tag decoder 200 detects a main driver control start tag corresponding to a parameter set instructing that the main driver 32 be switched to disabled state, or in other words, a train of a parameter start signal Ps, an end tag signal Te, a main driver control tag signal Drv_m, and a parameter end signal Pe. This switches the main driver 32 to non-operating state.

Note that in the present embodiment "frm_rate" is prepared as mentioned earlier as a control tag to switch the frame frequency between a default value and a predetermined value which differs from the default value. Alternatively, a control tag may be prepared which contains a frame-frequency-specifying parameter P so as to switch the frame frequency between three or more values or specify the frame frequency freely within a predetermined range. A control tag with a format "frm_rate=P" (P is a number) is an example of such a control tag. In these cases, for example, the repetition frequency of the clock signal CK, the horizontal synchronous signal HSY, and the vertical synchronous signal VSY is controlled in accordance with the value specified through the parameter P.

<4. Effects>

According to the embodiment, a display-use image signal is produced at the sending party of the display image data by adding a control parameter signal by which a display method is controlled to a display data signal representing the image to be displayed, and the produced display-use image signal is transmitted to a display device. This enables the sending party of the display image data to perform a wide range of control over a display method, from the switching among drivers for use in a display device including a main driver and sub-drivers to the turning on/off of a backlight in a liquid crystal panel and to the alteration of display frame frequency, eliminating the need for the receiving party (display device) of the display image data to exercise control over display functions by means of hardware. Further, the control parameter signal by which a display method is controlled is added to the display data signal so that the control parameter signal is sandwiched between two specifying signals, i.e. the parameter start signal Ps and the parameter end signal Pe, which are distinguishable from other signal parts, and therefore is not limited in terms of the position where the control parameter signal is added and the length of the control parameter signal. In other words, the position where the control parameter signal is added is not necessarily limited, for example, to a blanking interval or other specific periods. The length of the control parameter signal is not necessarily fixed either. Besides, complex controls combining kinds of controls are possible, for example, to implement simultaneous driver and backlight controls. In this manner, according to the embodiment, a wide range complex control can be easily and flexibly implemented for a display method.

Further, in the embodiment, the control of a plurality of drivers, of the backlight (or front light), the frame frequency, etc. can be all described as signal defining data in markup language using a single tag format. No separate display-use signal producing devices are not required as encoders of signal defining data. A single display-use signal producing device (encoder) is capable of producing a display-use image signal which is suitably used for implementing various controls for the display method.

Moreover, according to the embodiment, although the display unit 30, the main driver 32, the sub-driver 34, and the scan driver 36 are integrated on a matrix substrate, adding a control parameter signal by which a display method is controlled to a display-use image signal in the foregoing manner is advantageous in reducing the number of signals fed to the matrix substrate with integrated driver circuits. Note that the constitution using such a matrix substrate with integrated driver circuits gives more freedom in design, for the tag decoder 200 can be integrated to the substrate in realizing a display device of the embodiment.

<5. Modified Example>

In the control method of the embodiment, various tags, including drv_m, drv_s, blight, and frm_rate, are used to control the display device (FIG. 9); the embodiment may be arranged so that the display device is controlled using limited kinds of control tags.

Figures 15, 16:
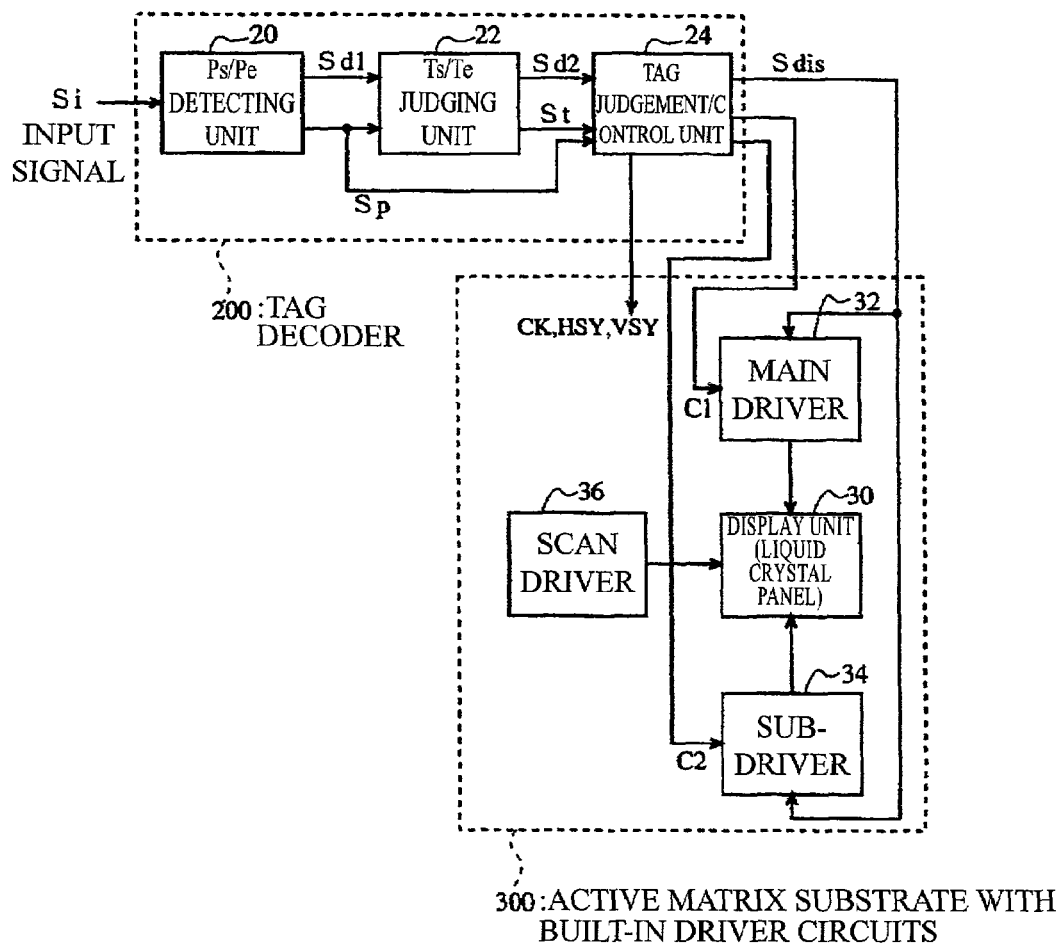
FIG. 16 is a block diagram showing the constitution of a display device in accordance with the first modified example of the embodiment.

For example, to control a display method for a display device constituted as in FIG. 16, only the control tags drv_m and drv_s which specifies the control of the main driver and the sub-driver respectively, as well as the display tag disp, may be used. In this case, for example, display-use image signals in FIGS. 11 and 12 are produced based on the signal defining data shown in FIGS. 15(*a*) and 15(*b*) respectively. Then, as these are fed as the display-use image signals Si to the display device in FIG. 16, the operation/non-operation of the main driver 32, the sub-driver 34, etc. of the display device is controlled according to the control parameter signals contained in the display-use image signal Si.

Figures 17, 18, 19:
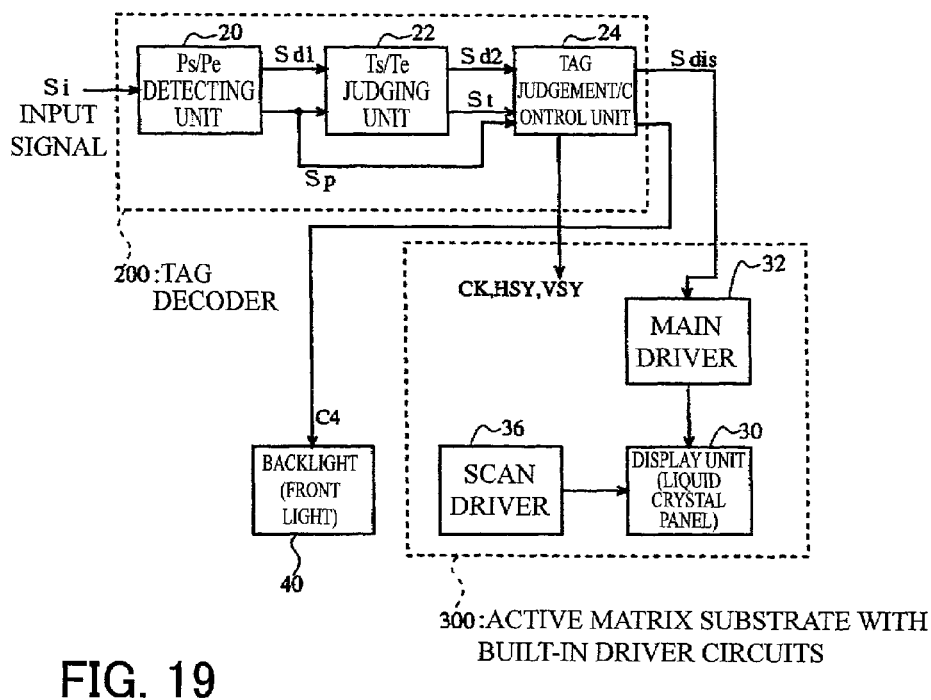
FIG. 17 shows signal defining data used in a second modified example of the embodiment.
FIG. 18 is a block diagram showing the constitution of a display device in accordance with the second modified example of the embodiment.
FIG. 19 shows signal defining data used in a third modified example of the embodiment.

Moreover, for example, to control the display method of a display device constituted as in FIG. 18, only the control tag blight which specifies the control of the backlight and the display tag disp may be used. In this case, for example, the display-use image signal shown in FIG. 13 is produced based on the signal defining data shown in FIG. 17. Then, as this is fed as the display-use image signal Si to the display device shown in FIG. 18, the turning on/off of the backlight 40 in the display device is controlled according to the control parameter signal contained in the display-use image signal Si.

Figure 20:
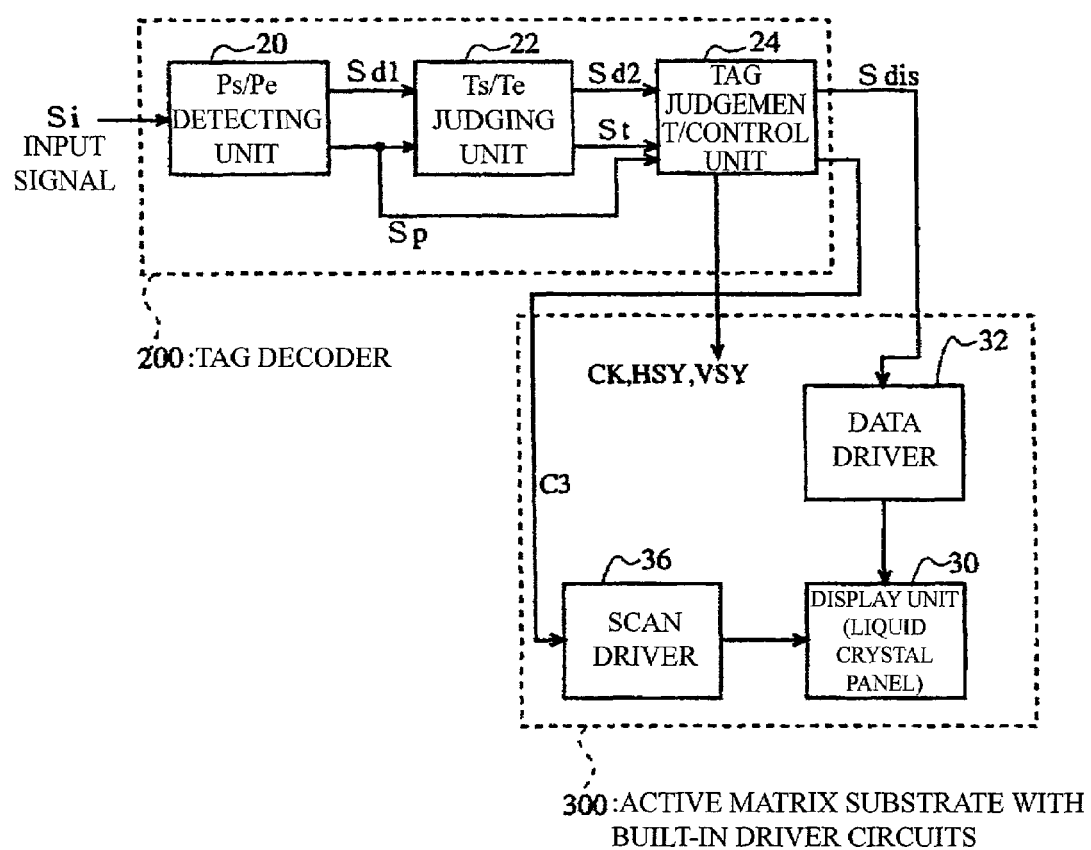
FIG. 20 is a block diagram showing the constitution of a display device in accordance with the third modified example of the embodiment.

Further, for example, to implement the control of a display method for a display device constituted as shown in FIG. 20, only the control tag frm_rate which specifies the control of frame frequency and display tag disp may be used. In this case, the display-use image signal shown in FIG. 14 is produced, for example, based on the signal defining data shown in FIG. 19. Then, as this is fed as the display-use image signal Si to the display device in FIG. 20, the display frame frequency of the display device is controlled in accordance with a control parameter signal contained in the display-use image signal Si.

Note that those elements of the display devices shown in FIGS. 16, 18, 20 bear the same reference numerals as the corresponding elements in the display device shown in FIG. 9. FIGS. 16, 18, 20 show the constitutions without the control/display signal judging unit 21 in FIG. 9. They may however include a control/display signal judging unit 21 as in FIG. 9.

As described in the foregoing, a first aspect of the invention is a control-information-based control method applied to an image display method using a display device, includes the step of feeding, to the display device, a display-use image signal carrying, in addition to display information representing an image to be displayed, control information by which a display method is controlled, and is characterized in that:

the display-use image signal contains a display data signal corresponding to the display information, a control parameter signal corresponding to the control information, a parameter start signal which is a first predetermined signal provided immediately before the control parameter signal, and a parameter end signal which is a second predetermined signal provided immediately after the control parameter signal; and the parameter start signal and the parameter end signal are distinguishable from other signals contained in the display-use image signal.

According to the first aspect of the invention, a display-use image signal carrying control information by which a display method is controlled is fed to a display device which displays the image represented by a display data signal by a display method based on a control parameter signal provided between a parameter start signal and a parameter end signal in the display-use image signal.

A second aspect of the invention is a control-information-based control method applied to an image display method using a display device, includes the step of feeding, to the display device, a display-use image signal carrying, in addition to display information representing an image to be displayed, control information by which a display method is controlled, and is characterized in that:

the display-use image signal contains an analog display data signal corresponding to the display information and a control information signal corresponding to the control information; and the control information signal is made distinguishable from the display data signal by either specifying a maximum electric potential level of the control information signal to a value lower than a minimum electric potential level of the display data signal or specifying a minimum electric potential level of the control information signal to a value higher than a maximum electric potential level of the display data signal.

According to the second aspect of the invention, a display-use image signal carrying control information by which a display method is controlled and an analog display data signal is fed to a display device where the control information signal is distinguishable in the display-use image signal by means of differences in electric potential level between the control information signal and the display data signal. Therefore, in the display device, the image represented by the display data signal is displayed by the display method based on the control information signal.

A third aspect of the invention is a control-information-based control method applied to an image display method using a display device, includes the step of feeding, to the display device, a display-use image signal carrying, in addition to display information representing an image to be displayed, control information by which a display method is controlled, and is characterized in that:

the display-use image signal contains a digital display data signal corresponding to the display information and a control information signal corresponding to the control information; and the control information signal is made distinguishable from the display data signal by specifying a frequency of the control information signal to a value greater than a frequency of the display data signal.

According to the third aspect of the invention, a display-use image signal carrying control information by which a display method is controlled and a digital display data signal is fed to a display device where the control information signal is distinguishable in the display-use image signal by means of differences in frequency between the control information signal and the display data signal. Therefore, in the display device, the image represented by the display data signal is displayed by the display method based on the control information signal.

A fourth aspect of the invention is a display-use signal producing device for producing a display-use image signal carrying, in addition to display information representing an image to be displayed, control information by which an image display method is controlled, and is characterized in that:

signal producing means for receiving signal defining data by which a structure of the display-use image signal to be produced is defined and producing a parameter-added display data signal containing a control parameter signal corresponding to the control information and a display data signal corresponding to the display information in accordance with the signal defining data; and parameter start/end signal appending means for appending a parameter start signal, which is a first predetermined signal, distinguishable from other signals, immediately before the control parameter signal in the parameter-added display data signal and appending a parameter end signal which is a second predetermined signal, distinguishable from other signals, immediately after the control parameter signal in the parameter-added display data signal.

According to the fourth aspect of the invention, a control parameter signal by which a display method is controlled is added to a display-use image signal between two specific signals, namely a parameter start signal and a parameter end signal, which are distinguishable from other signal parts.

A fifth aspect of the invention is characterized, in the fourth aspect of the invention, in that the signal producing means holds two signals, which are a control start parameter signal specifying a start of control of the display method based on the control parameter signal and a control end parameter signal specifying an end of control of the display method based on the control parameter signal, as the control parameter signal in advance and includes the two signals as a pair in the parameter-added display data signal.

According to the fifth aspect of the invention, a signal division, of a display-use image signal, containing display information on an image to be displayed by a display method based on a control parameter signal is specified by means of a control start parameter and a control end parameter.

A sixth aspect of the invention is characterized, in the fifth aspect of the invention, in that:

the control start parameter signal includes a control tag signal specifying a factor to be designated as a controlled object among factors dictating the display method and a control start identification signal specifying a start of control of the factor specified as the controlled object; and the control end parameter signal includes a control tag signal specifying a factor to be designated as a controlled object among factors dictating the display method and a control end identification signal specifying an end of control of the factor specified as the controlled object.

A seventh aspect of the invention is a display-use signal producing device for producing a display-use image signal carrying, in addition to display information representing an image to be displayed, control information by which an image display method is controlled, and is characterized in that the display-use signal producing device includes:

signal producing means for receiving signal defining data by which a structure of the display-use image signal to be produced is defined and producing the display-use image signal containing a control information signal corresponding to the control information and an analog display data signal corresponding to the display information in accordance with the signal defining data;

signal level judging means for judging an electric potential level of the display data signal; and electric potential level specifying means for either causing a maximum electric potential level of the control information signal contained in the display-use image signal produced by the signal producing means to be lower than a minimum electric potential level of the display data signal or causing a minimum electric potential level of the control information signal to be higher than a maximum electric potential level of the display data signal based on the electric potential level of the display data signal judged by the signal level judging means.

According to the seventh aspect of the invention, control information by which a display method is controlled signal is added to a display-use image signal in such a form that the control information is distinguishable from an analog display data signal.

An eighth aspect of the invention is a display-use signal producing device for producing a display-use image signal carrying, in addition to display information representing an image to be displayed, control information by which an image display method is controlled, and is characterized in that the display-use signal producing device includes:

signal producing means for receiving signal defining data by which a structure of the display-use image signal to be produced is defined and producing the display-use image signal containing a control information signal corresponding to the control information and a digital display data signal corresponding to the display information in accordance with the signal defining data;

signal frequency judging means for judging a frequency of the display data signal; and clock signal producing means for causing a frequency of the control information signal contained in the display-use image signal produced by the signal producing means to be higher than the frequency of the display data signal based on the signal frequency of the display data signal judged by the signal frequency judging means.

According to the eighth aspect of the invention, control information by which a display method is controlled signal is added to a display-use image signal in such a format that the control information is distinguishable from an analog display data signal.

A ninth aspect of the invention is a display device for receiving a display-use image signal carrying, in addition to display information representing an image to be displayed, control information by which an image display method is controlled and displaying the image represented by the display information by the display method based on the control information, and is characterized in that the display device includes:

detecting means for receiving, as the display-use image signal, a signal containing: a display data signal corresponding to the display information, a control parameter signal corresponding to the control information, a parameter start signal which is a first specifying signal provided immediately before the control parameter signal, and a parameter end signal which is a second specifying signal provided immediately after the control parameter signal and detecting the parameter start signal and the parameter end signal in the received display-use image signal; and display control means for deriving, as a control parameter signal, a signal part sandwiched between the parameter start signal and the parameter end signal detected in the display-use image signal and controlling the method of displaying the image represented by the display data signal based on the derived control parameter signal.

According to the ninth aspect of the invention, as a display-use image signal is fed to a display device, the image represented by a display data signal is displayed by a display method based on a control parameter signal provided between a parameter start signal and a parameter end signal in the display-use image signal.

A tenth aspect of the invention is characterized, in the ninth aspect of the invention, in that:

the detecting means receives the display-use image signal containing two signals, which are a control start parameter signal specifying a start of control of the display method based on the control parameter signal and a control end parameter signal specifying an end of control of the display method based on the control parameter signal, as the control parameter signal; and the display control means judges whether the derived control parameter signal is the control start parameter signal or the control end parameter signal and controls the method of displaying the image represented by the display data signal provided between the control start parameter signal and the control end parameter signal based on the derived control parameter signal.

According to the tenth aspect of the invention, the image represented by a display data signal provided between a control start parameter signal and a control end parameter signal in the display-use image signal is displayed by a display method based on a control parameter signal contained in externally supplied display-use image signal.

An eleventh aspect of the invention is characterized, in the tenth aspect of the invention, in that:

the control start parameter signal includes a control tag signal specifying a factor to be designated as a controlled object among factors dictating the display method and a control start identification signal specifying a start of control of the factor specified as the controlled object;

the control end parameter signal includes a control tag signal specifying a factor to be designated as a controlled object among factors dictating the display method and a control end identification signal specifying an end of control of the factor specified as the controlled object; and the display control means judges whether the derived control parameter signal contains the control start identification signal or the control end identification signal and controls the method of displaying the image represented by the display data signal provided between the control parameter signal containing the control start identification signal and the control parameter signal containing the control end identification signal based on the control tag signal contained in the derived control parameter signal.

A twelfth aspect of the invention is characterized, in the tenth aspect of the invention, in that the display device further includes:

a display unit including a plurality of data signal lines, a plurality of scan signal lines intersecting the plurality of data signal lines, and a pixel array of pixel forming means provided at respective intersections of the plurality of data signal lines and the plurality of scan signal lines;

scan driver means for applying a scan signal by which the pixel array is selected sequentially line by line to the plurality of scan signal lines; and data driver means for applying a drive-use image signal by which the pixel array displays the image represented by the display information to the plurality of data signal lines, wherein:

at least either one of the scan driver means and the data driver means includes a plurality of driver circuits;

the control start parameter signal instructs which one of the plurality of driver circuits is to be selected and to switch the selected driver circuit to operating state; and the control end parameter signal instructs to switch the selected driver circuit to non-operating state.

According to the twelfth aspect of the invention, a display unit is driven by a driver circuit specified by means of a control parameter signal contained in an externally supplied display-use image signal. Thus, the image represented by a display data signal provided between a control start parameter signal and a control end parameter signal constituting the control parameter is displayed by the display unit.

A thirteenth aspect of the invention is characterized, in the tenth aspect of the invention, in that the display device further includes a backlight or a front light to display the image represented by the display data signal, wherein:

the control start parameter signal instructs to turn on the backlight or the front light; and the control end parameter signal instructs to turn off the backlight or the front light.

According to the thirteenth aspect of the invention, a backlight or a front light is turned on when the image represented by a display data signal provided between a control start parameter signal and a control end parameter signal contained in an externally supplied display-use image signal is displayed, and then turned off after the display is finished.

A fourteenth aspect of the invention is characterized, in the tenth aspect of the invention, in that the display device further includes a frame frequency altering means for altering a frame frequency in displaying the image represented by a display data signal, wherein:

the control start parameter signal instructs to alter the frame frequency from a predetermined first frequency to a second frequency; and the control end parameter signal instructs to alter the frame frequency from the second frequency back to the first frequency.

According to the fourteenth aspect of the invention, a frame frequency is specified to a second frequency when the image represented by a display data signal provided between a control start parameter signal and a control end parameter signal contained in an externally supplied display-use image signal is displayed, and then changed back to a first frequency after the display is finished.

A fifteenth aspect of the invention is characterized, in any one of the ninth to fourteenth aspects of the invention, in that the display device further includes an active matrix substrate with an integrated driver circuit which includes a liquid crystal panel for displaying the image represented by the display information.

As with a display device in accordance with the fifteenth aspect of the invention, when the liquid crystal panel and its driver circuit are provided as a matrix substrate with an integrated driver circuit, adding a control parameter signal by which a display method is controlled to a display-use image signal is advantageous in reducing the number of input signals to the matrix substrate with an integrated driver circuit.

A sixteenth aspect of the invention is a display device for receiving a display-use image signal carrying, in addition to display information representing an image to be displayed, control information by which an image display method is controlled and displaying the image represented by the display information by the display method based on the control information, the display device includes:

a control/display signal judging unit for extracting a control information signal corresponding to the control information from a display-use image signal including the control information signal and an analog display data signal corresponding to the display information, the control information signal being such that either a maximum electric potential level thereof is specified to be lower than a minimum electric potential level of the display data signal or a minimum electric potential level thereof is specified to be higher than a maximum electric potential level of the display data signal, by receiving the display-use image signal and checking whether the received display-use image signal has an electric potential level higher or lower than a reference electric potential level; and display control means for controlling the method of displaying the image represented by the display data signal based on the control information signal extracted from the display-use image signal.

According to the sixteenth aspect of the invention, as a display-use image signal is fed to a display device, the image represented by a display data signal is displayed by a display method based on a control information signal provided so as to be distinguishable from an analog display data signal in the display-use image signal.

A seventeenth aspect of the invention is a display device for receiving a display-use image signal carrying, in addition to display information representing an image to be displayed, control information by which an image display method is controlled and displaying the image represented by the display information by the display method based on the control information, and is characterized in that the display device includes:

a control/display signal judging unit for extracting a control information signal corresponding to the control information from the display-use image signal including the control information signal and a digital display data signal corresponding to the display information, by receiving the display-use image signal of which the control information signal is specified to have a frequency higher than that of the display data signal and checking whether the received display-use image signal has a frequency higher or lower than a reference frequency; and display control means for controlling the method of displaying the image represented by the display data signal based on the control information signal extracted from the display-use image signal.

According to the seventeenth aspect of the invention, as a display-use image signal is fed to a display device, the image represented by a display data signal is displayed by a display method based on a control information signal provided so as to be distinguishable from a digital display data signal in the display-use image signal.

An eighteenth aspect of the invention is a display system including:

a display-use signal producing device for producing a display-use image signal carrying, in addition to display information representing an image to be displayed, control information by which an image display method is controlled; and a display device for receiving the display-use image signal and displaying the image represented by the display information by the display method based on the control information, and is characterized in that:

the display-use signal producing device includes signal producing means for receiving signal defining data by which a structure of the display-use image signal to be produced is defined and producing a parameter-added display data signal containing a control parameter signal corresponding to the control information and a display data signal corresponding to the display information in accordance with the signal defining data, and parameter start/end signal appending means for appending a parameter start signal, which is a first specifying signal, immediately before the control parameter signal in the parameter-added display data signal and appending a parameter end signal, which is a second specifying signal, immediately after the control parameter signal in the parameter-added display data signal; and the display device includes detecting means for detecting a parameter start signal and a parameter end signal in the display-use image signal, and display control means for deriving, as a control parameter signal, a signal part sandwiched between the parameter start signal and the parameter end signal detected in the display-use image signal, and controlling the method of displaying the image represented by the display information based on the derived control parameter signal.

A nineteenth aspect of the invention is a display system including a display-use signal producing device for producing a display-use image signal carrying, in addition to display information representing an image to be displayed, control information by which an image display method is controlled, and a display device for receiving the display-use image signal and displaying the image represented by display information by the display method based on the control information, and is characterized in that:

the display-use signal producing device includes signal producing means for receiving signal defining data by which a structure of the display-use image signal to be produced is defined and producing the display-use image signal containing a control information signal corresponding to the control information and an analog display data signal corresponding to the display information in accordance with the signal defining data, a signal level judging unit for judging an electric potential level of the display data signal, and electric potential level specifying means for either causing a maximum electric potential level of the control information signal contained in the display-use image signal produced by the signal producing means to be lower than a minimum electric potential level of the display data signal or causing a minimum electric potential level of the control information signal to be higher than a maximum electric potential level of the display data signal based on the electric potential level of the display data signal judged by the signal level judging means; and the display device includes a control/display signal judging unit for extracting the control information signal from the display-use image signal by receiving the display-use image signal produced by the display-use signal producing device and checking whether the received display-use image signal has an electric potential level higher or lower than a reference electric potential level, and a display control means for controlling the method of displaying the image represented by the display information based on the control information signal extracted from the display-use image signal.

A twentieth aspect of the invention is a display system including a display-use signal producing device for producing a display-use image signal carrying, in addition to display information representing an image to be displayed, control information by which an image display method is controlled, and a display device for receiving the display-use image signal and displaying the image represented by the display information by the display method based on the control information, and is characterized in that:

the display-use signal producing device includes signal producing means for receiving signal defining data by which a structure of the display-use image signal to be produced is defined and producing the display-use image signal containing a control information signal corresponding to the control information and a digital display data signal corresponding to the display information in accordance with the signal defining data, a signal frequency judging unit for judging a frequency of the display data signal, and clock signal producing means for causing a frequency of the control information signal contained in the display-use image signal produced by the signal producing means to be higher than the frequency of the display data signal based on signal frequency of the display signal data judged by the signal level judging unit; and the display device includes a control/display signal judging unit for extracting the control information signal from the display-use image signal by receiving the display-use image signal produced by the display-use signal producing device and checking whether the received display-use image signal has a frequency higher or lower than a reference frequency, and display control means for controlling the method of displaying the image represented by the display information based on the control information signal extracted from the display-use image signal.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A display device for receiving a display-use image signal carrying, in addition to display information representing an image to be displayed, control information by which an image display method is controlled and displaying the image represented by the display information by the display method based on the control information, said display device comprising:

detecting means for receiving, as the display-use image signal, a signal containing: a display data signal corresponding to the display information, a control parameter signal corresponding to the control information operable to control display functions of the display device, a parameter start signal which is a first specifying signal provided immediately before the control parameter signal, and a parameter end signal which is a second specifying signal provided immediately after the control parameter signal and detecting the parameter start signal and the parameter end signal in the received display-use image signal, wherein the control parameter signal is a digital signal; and display control means for deriving, as a control parameter signal, a signal part sandwiched between the parameter start signal and the parameter end signal detected in the display-use image signal and controlling the method of displaying the image represented by the display data signal based on the derived control parameter signal, wherein the detecting means receives the display-use image signal containing two signals, which are a control start parameter signal specifying a start of control of the display method based on the control parameter signal and a control end parameter signal specifying an end of control of the display method based on the control parameter signal, as the control parameter signal; and the display control means judges whether the derived control parameter signal is the control start parameter signal or the control end parameter signal and controls the method of displaying the image represented by the display data signal provided between the control start parameter signal and the control end parameter signal based on the derived control parameter signal, further comprising a display unit including a plurality of data signal lines, a plurality of scan signal lines intersecting the plurality of data signal lines, and a pixel array of pixel forming means provided at respective intersections of the plurality of data signal lines and the plurality of scan signal lines;

scan driver means for applying a scan signal by which the pixel array is selected sequentially line by line to the plurality of scan signal lines; and data driver means for applying a drive-use image signal by which the pixel array displays the image represented by the display information to the plurality of data signal lines, wherein:

at least either one of the scan driver means and the data driver means includes a plurality of driver circuits;

the control start parameter signal instructs which one of the plurality of driver circuits is to be selected and to switch the selected driver circuit to operating state; and the control end parameter signal instructs to switch the selected driver circuit to non-operating state.

2. A display device for receiving a display-use image signal carrying, in addition to display information representing an image to be displayed, control information by which an image display method is controlled and displaying the image represented by the display information by the display method based on the control information, said display device comprising:

detecting means for receiving, as the display-use image signal, a signal containing: a display data signal corresponding to the display information, a control parameter signal corresponding to the control information operable to control display functions of the display device, a parameter start signal which is a first specifying signal provided immediately before the control parameter signal, and a parameter end signal which is a second specifying signal provided immediately after the control parameter signal and detecting the parameter start signal and the parameter end signal in the received display-use image signal, wherein the control parameter signal is a digital signal; and display control means for deriving, as a control parameter signal, a signal part sandwiched between the parameter start signal and the parameter end signal detected in the display-use image signal and controlling the method of displaying the image represented by the display data signal based on the derived control parameter signal, wherein the detecting means receives the display-use image signal containing two signals, which are a control start parameter signal specifying a start of control of the display method based on the control parameter signal and a control end parameter signal specifying an end of control of the display method based on the control parameter signal, as the control parameter signal; and the display control means judges whether the derived control parameter signal is the control start parameter signal or the control end parameter signal and controls the method of displaying the image represented by the display data signal provided between the control start parameter signal and the control end parameter signal based on the derived control parameter signal, further comprising a frame frequency altering means for altering a frame frequency in displaying the image represented by the display data signal, wherein:

the control start parameter signal instructs to alter the frame frequency from a predetermined first frequency to a second frequency; and the control end parameter signal instructs to alter the frame frequency from the second frequency back to the first frequency.

3. A display device for receiving a display-use image signal carrying, in addition to display information representing an image to be displayed, control information by which an image display method is controlled and displaying the image represented by the display information by the display method based on the control information, said display device comprising:
  detecting means for receiving, as the display-use image signal, a signal containing: a display data signal corresponding to the display information, a control parameter signal corresponding to the control information operable to control display functions of the display device, a parameter start signal which is a first specifying signal provided immediately before the control parameter signal, and a parameter end signal which is a second specifying signal provided immediately after the control parameter signal and detecting the parameter start signal and the parameter end signal in the received display-use image signal, wherein the control parameter signal is a digital signal;
  display control means for deriving, as a control parameter signal, a signal part sandwiched between the parameter start signal and the parameter end signal detected in the display-use image signal and controlling the method of displaying the image represented by the display data signal based on the derived control parameter signal; and
  an active matrix substrate with an integrated driver circuit which includes a liquid crystal panel for displaying the image represented by the display information.

4. A display system, comprising:
  a display-use signal producing device for producing a display-use image signal carrying, in addition to display information representing an image to be displayed, control information by which an image display method is controlled; and
  a display device for receiving the display-use image signal and displaying the image represented by the display information by the display method based on the control information, wherein:
  the display-use signal producing device includes
  signal producing means for receiving signal defining data by which a structure of the display-use image signal to be produced is defined and producing a parameter-added display data signal containing a control parameter signal corresponding to the control information operable to control display functions of the display device, and a display data signal corresponding to the display information in accordance with the signal defining data, wherein the control parameter signal is a digital signal, and
  parameter staff/end signal appending means for appending a parameter start signal, which is a first specifying signal, immediately before the control parameter signal in the parameter-added display data signal and appending a parameter end signal, which is a second specifying signal, immediately after the control parameter signal in the parameter-added display data signal; and
  the display device includes
  detecting means for detecting a parameter start signal and a parameter end signal in the display-use image signal, and
  display control means for deriving, as a control parameter signal, a signal part sandwiched between the parameter start signal and the parameter end signal detected in the display-use image signal, and controlling the method of displaying the image represented by the display information based on the derived control parameter signal,
  wherein the detecting means receives the display-use image signal containing two signals, which are a control start parameter signal specifying a start of control of the display method based on the control parameter signal and a control end parameter signal specifying an end of control of the display method based on the control parameter signal, as the control parameter signal; and
  the display control means judges whether the derived control parameter signal is the control start parameter signal or the control end parameter signal and controls the method of displaying the image represented by the display data signal provided between the control start parameter signal and the control end parameter signal based on the derived control parameter signal,
  further comprising a display unit including a plurality of data signal lines, a plurality of scan signal lines intersecting the plurality of data signal lines, and a pixel array of pixel forming means provided at respective intersections of the plurality of data signal lines and the plurality of scan signal lines;
  scan driver means for applying a scan signal by which the pixel array is selected sequentially line by line to the plurality of scan signal lines; and
  data driver means for applying a drive-use image signal by which the pixel array displays the image represented by the display information to the plurality of data signal lines, wherein:
  at least either one of the scan driver means and the data driver means includes a plurality of driver circuits;
  the control start parameter signal instructs which one of the plurality of driver circuits is to be selected and to switch the selected driver circuit to operating state; and
  the control end parameter signal instructs to switch the selected driver circuit to non-operating state.

5. The display device as defined in claim 1, wherein:
  the control start parameter signal includes a control tag signal specifying a factor to be designated as a controlled object among factors dictating the display method and a control start identification signal specifying a start of control of the factor specified as the controlled object;
  the control end parameter signal includes a control tag signal specifying a factor to be designated as a controlled object among factors dictating the display method and a control end identification signal specifying an end of control of the factor specified as the controlled object; and
  the display control means judges whether the derived control parameter signal contains the control start identification signal or the control end identification signal and controls the method of displaying the image represented by the display data signal provided between the control parameter signal containing the control start identification signal and the control parameter signal containing the control end identification signal based on the control tag signal contained in the derived control parameter signal.

6. The display device as defined in claim 2, further comprising a backlight or a front light to display the image represented by the display data signal, wherein:
  the control start parameter signal instructs to turn on the backlight or the front light; and the control end parameter signal instructs to turn off the backlight or the front light.

7. A display system, comprising:

a display-use signal producing device for producing a display-use image signal carrying, in addition to display information representing an image to be displayed, control information by which an image display method is controlled; and a display device for receiving the display-use image signal and displaying the image represented by the display information by the display method based on the control information, wherein:

the display-use signal producing device includes signal producing means for receiving signal defining data by which a structure of the display-use image signal to be produced is defined and producing a parameter-added display data signal containing a control parameter signal corresponding to the control information operable to control display functions of the display device, and a display data signal corresponding to the display information in accordance with the signal defining data, wherein the control parameter signal is a digital signal, and parameter start/end signal appending means for appending a parameter start signal, which is a first specifying signal, immediately before the control parameter signal in the parameter-added display data signal and appending a parameter end signal, which is a second specifying signal, immediately after the control parameter signal in the parameter-added display data signal; and the display device includes detecting means for detecting a parameter start signal and a parameter end signal in the display-use image signal, and display control means for deriving, as a control parameter signal, a signal part sandwiched between the parameter start signal and the parameter end signal detected in the display-use image signal, and controlling the method of displaying the image represented by the display information based on the derived control parameter signal, wherein the detecting means receives the display-use image signal containing two signals, which are a control start parameter signal specifying a start of control of the display method based on the control parameter signal and a control end parameter signal specifying an end of control of the display method based on the control parameter signal, as the control parameter signal; and the display control means judges whether the derived control parameter signal is the control start parameter signal or the control end parameter signal and controls the method of displaying the image represented by the display data signal provided between the control start parameter signal and the control end parameter signal based on the derived control parameter signal, further comprising a frame frequency altering means for altering a frame frequency in displaying the image represented by the display data signal, wherein:

the control start parameter signal instructs to alter the frame frequency from a predetermined first frequency to a second frequency; and the control end parameter signal instructs to alter the frame frequency from the second frequency back to the first frequency.

8. A display system, comprising:

a display-use signal producing device for producing a display-use image signal carrying, in addition to display information representing an image to be displayed, control information by which an image display method is controlled; and a display device for receiving the display-use image signal and displaying the image represented by the display information by the display method based on the control information, wherein:

the display-use signal producing device includes signal producing means for receiving signal defining data by which a structure of the display-use image signal to be produced is defined and producing a parameter-added display data signal containing a control parameter signal corresponding to the control information operable to control display functions of the display device, and a display data signal corresponding to the display information in accordance with the signal defining data, wherein the control parameter signal is a digital signal, and parameter staff/end signal appending means for appending a parameter start signal, which is a first specifying signal, immediately before the control parameter signal in the parameter-added display data signal and appending a parameter end signal, which is a second specifying signal, immediately after the control parameter signal in the parameter-added display data signal; and the display device includes detecting means for detecting a parameter start signal and a parameter end signal in the display-use image signal, display control means for deriving, as a control parameter signal, a signal part sandwiched between the parameter start signal and the parameter end signal detected in the display-use image signal, and controlling the method of displaying the image represented by the display information based on the derived control parameter signal, and an active matrix substrate with an integrated driver circuit which includes a liquid crystal panel for displaying the image represented by the display information.

* * * * *

UNITED STATES PATENT AND TRADEMARK OFFICE
CERTIFICATE OF CORRECTION

| | | |
|---|---|---|
| PATENT NO. | : 7,348,955 B2 | Page 1 of 1 |
| APPLICATION NO. | : 10/170523 | |
| DATED | : March 25, 2008 | |
| INVENTOR(S) | : Masakazu Satoh et al. | |

It is certified that error appears in the above-identified patent and that said Letters Patent is hereby corrected as shown below:

Title page,

Item (30) Foreign Application Priority Data should read as follows:

May 16, 2002        (JP) ........................................................ 2002-141916

Signed and Sealed this

Twenty-second Day of July, 2008

JON W. DUDAS
*Director of the United States Patent and Trademark Office*